United States Patent
Murata

(10) Patent No.: US 8,749,706 B2
(45) Date of Patent: Jun. 10, 2014

(54) IMAGE PROCESSING APPARATUS AND RECORDING MEDIUM STORING IMAGE PROCESSING PROGRAM

(71) Applicant: Yukiko Murata, Wakayama (JP)

(72) Inventor: Yukiko Murata, Wakayama (JP)

(73) Assignee: NK Works Co., Ltd. (JP)

( * ) Notice: Subject to any disclaimer, the term of this patent is extended or adjusted under 35 U.S.C. 154(b) by 0 days.

(21) Appl. No.: 13/940,825

(22) Filed: Jul. 12, 2013

(65) Prior Publication Data
US 2014/0016033 A1 Jan. 16, 2014

(30) Foreign Application Priority Data
Jul. 12, 2012 (JP) ................................. 2012-156966

(51) Int. Cl.
*H04N 7/01* (2006.01)

(52) U.S. Cl.
USPC ......................................... 348/448; 348/452

(58) Field of Classification Search
CPC ....... H04N 7/0142; H04N 7/01; H04N 7/012; H04N 7/0115; H04N 7/0137; H04N 7/0135; H04N 7/014; H04N 5/144; G06T 3/4007; G06T 2207/10016

USPC .......................... 348/448, 452, 451, 459, 458
IPC ............................................... H04N 7/01,11/20
See application file for complete search history.

(56) References Cited

U.S. PATENT DOCUMENTS

| 2002/0136305 A1* | 9/2002 | Kim et al. ................ 375/240.17 |
| 2008/0018788 A1* | 1/2008 | Zhou et al. .................... 348/452 |
| 2008/0186401 A1* | 8/2008 | Sun et al. ...................... 348/452 |

FOREIGN PATENT DOCUMENTS

JP            2010141717 A           6/2010

* cited by examiner

*Primary Examiner* — Sherrie Hsia
(74) *Attorney, Agent, or Firm* — St. Onge Steward Johnston & Reens LLC

(57) ABSTRACT

An image processing apparatus that includes an interlacing determination unit and a deinterlacing unit is provided. The interlacing determination unit determines whether or not a frame is an interlaced image by performing image processing on body data of the frame. An interlaced image is an image that includes a top field image and a bottom field image at different times on a timeline. If it was determined that the frame is an interlaced image, the deinterlacing unit deinterlaces the frame and generates a new frame.

20 Claims, 18 Drawing Sheets

IMAGE PROCESSING APPARATUS AND RECORDING MEDIUM STORING IMAGE PROCESSING PROGRAM

FIELD OF INVENTION

The present invention relates to an image processing apparatus for deinterlacing an image, and to a recording medium storing an image processing program for the same.

BACKGROUND

Conventionally, there are known to be various techniques for deinterlacing an image, or in other words, for converting an interlaced image into a progressive image. As is widely known, an interlaced image is an image that is a combination of a top field image (an odd-numbered row image in the case of numbering from an odd-numbered first row, and an even-numbered row image in the case of numbering from an even-numbered first row) and a bottom field image (an even-numbered row image in the case of numbering from an odd-numbered first row, and an odd-numbered row image in the case of numbering from an even-numbered first row) that were captured at different times. Due to this time difference, the same subject appearing in an interlaced image is horizontally shifted alternately between the odd-numbered rows and the even-numbered rows, and as a result, a horizontal stripe pattern called interlace striping tends to appear.

Since this interlace striping appears as jaggedness and flickering to the human eye, it is often the situation that deinterlacing is desired when interlaced images are handled as still images, for example. Patent Literature 1 (JP 2010-141717A) is related to an apparatus for capturing a still image from a moving image, this apparatus automatically determines whether or not frames to be captured are interlaced images, and automatically deinterlaces frames that were determined to be interlaced images.

However, in order to determine whether or not frames are interlaced images, the apparatus in Patent Literature 1 references a predetermined flag recorded in association with each frame in a predetermined data area in the moving image data. This flag uses "0" and "1" to indicate whether or not the frames in the moving image data are interlaced images or progressive images, and is metadata that is multiplexed with the data body of the frames in the moving image data.

Accordingly, with the apparatus of Patent Literature 1, the automatic determination of whether or not a frame is an interlaced image cannot be performed on frames in moving image data that does not have the above-described flag recorded therein. Furthermore, the data area in which the above-described flag is recorded in the moving image data is determined according to the algorithm used by the encoder that compressed the moving image data. Accordingly, even if the above-described flag is recorded in the moving image data, it cannot be referenced unless the algorithm that was used by the encoder is known. In other words, the apparatus in Patent Literature 1 cannot correctly determine whether or not a frame is an interlaced image with frames in any data format, and there is a limit to the number of data formats with which it is possible to correctly determine whether or not a frame is an interlaced image.

SUMMARY OF INVENTION

An object of the present invention is to provide an image processing apparatus that can correctly determine whether or not a frame is an interlaced image with frames in a wide variety of data formats, and a recording medium storing an image processing program capable of the same.

An image processing apparatus according to a first aspect of the present invention includes: an interlacing determination unit and a deinterlacing unit. By performing image processing on body data of a frame, the interlacing determination unit is configured to determine whether or not the frame is an interlaced image. An interlaced image is an image that includes a top field image and a bottom field image at different times on a timeline. The deinterlacing unit is configured to deinterlace the frame and generate a new frame in a case of a determination that the frame is an interlaced image.

Here, before frames are deinterlaced, it is automatically determined, based on the data body of a frame, whether or not the frame is an interlaced image, that is to say, whether or not the data body of the frame needs to be deinterlaced. Accordingly, rather than being limited to frames in the above-described data format according to which a predetermined flag is recorded in a predetermined data area, it is possible to correctly determine whether or not frames in a wide variety of data formats are interlaced images.

Note that the case "generates a new frame" includes the case where at least either the top field image or the bottom field image is used, as is, as the deinterlaced frame. Also, there is no limit whatsoever on the number of new frames for one original frame here.

An image processing apparatus according to a second aspect of the present invention is the image processing apparatus according to the first aspect, wherein the interlacing determination unit is configured to determine whether or not the frame is the interlaced image by comparing the top field image and the bottom field image and determining whether or not a moving subject exists in the frame.

If the frame is an interlaced image, a time lag exists between the time to which the top field image belongs and the time to which the bottom field image belongs. Accordingly, if there is a subject that is moving in the frame (moving subject), that movement of the subject will be reflected in the result of comparing the top field image and the bottom field image. Note that the result of comparing the top field image and the bottom field image is typically a difference image that is the difference between the top field image and the bottom field image.

Here, in light of the above-described point, whether or not a moving subject exists is determined based on the result of comparing the top field image and the bottom field image, in order to determine whether or not the frame is an interlaced image. This enables precisely determining whether or not the frame is an interlaced image.

Note that in the present specification, the term "top field image" means not only the odd-numbered or even-numbered row image included in an interlaced image (the odd-numbered row image in the case of numbering from an odd-numbered first row, and the even-numbered row image in the case of numbering from an even-numbered first row, the same following hereinafter), but also the odd-numbered or even-numbered row image included in a progressive image. The same follows with the bottom field image as well.

An image processing apparatus according to a third aspect of the present invention is the image processing apparatus according to the first aspect or the second aspect, wherein the interlacing determination unit is configured to determine whether or not the frame is the interlaced image by determining whether or not a moving subject exists in the frame after reducing influence of a motionless subject in the frame using the body data of a plurality of frames on the timeline.

As described above, placing focus on the existence of a moving subject is one important approach to the determination of whether or not the frame is a interlaced image. However, a frame normally includes not only a moving subject, but also a subject that is not moving in the frame (motionless subject), and the existence of that motionless subject becomes noise when detecting a moving subject. Accordingly, it is preferable that the existence of a motionless subject in the frame is eliminated to the greatest extent possible.

Incidentally, a moving subject and a motionless subject can be easily distinguished from each other when looking at multiple frames on the timeline. This is because a moving subject will exist at different positions in multiple frames on the timeline, whereas a motionless subject will exist at the same position.

Here, in light of the above point, the influence of a motionless subject in the frame is reduced using the body data of multiple frames on the timeline, that is to say, the existence of a moving subject in the frame is relatively emphasized, and then it is determined whether or not a moving subject exists in the frame. This enables precisely determining whether or not the frame is an interlaced image.

Note that in the case where the operation for comparing the top field image and the bottom field image (second aspect) and the operation for reducing the influence of a motionless subject in the frame (third aspect) are both executed, it does not matter which step is performed first.

An image processing apparatus according to a fourth aspect of the present invention is the image processing apparatus according to any of the first to third aspects, wherein the interlacing determination unit is configured to determine whether or not a group of frames on the timeline is a group of interlaced images by performing image processing on the body data of at least a portion of the frames included in the group of frames. Also, in a case of a determination that the group of frames is a group of interlaced images, the deinterlacing unit is configured to deinterlace the group of frames and generate a group of new frames.

Normally, a group of frames that belong to the same timeline will often all be interlaced images or all be progressive images, and the case where only some of the frames on the same timeline are interlaced image is thought to not often occur.

For this reason, here, the determination regarding whether or not a frame is interlaced is performed with respect to the group of frames on the timeline as a whole. If it is determined that the group of frames is interlaced as a whole, deinterlacing is performed on the entire group of frames. This enables deinterlacing to be performed in a reasonable manner.

An image processing apparatus according to a fifth aspect of the present invention is the image processing apparatus according to any of the first to fourth aspects, further including an order determination unit. In a case of a determination that the frame is an interlaced image, the order determination unit is configured to determine a field order of the top field image and the bottom field image by performing image processing on the body data of the frame.

Here, the field order is automatically determined for a frame that was determined to be an interlaced image. This enables deinterlacing frames with consideration given to the field order. Note that the field order is the order of the times to which the top field image and the bottom field image belong in the same frame.

An image processing apparatus according to a sixth aspect of the present invention is the image processing apparatus according to the fifth aspect, wherein the order determination unit is configured to compare a first difference with a second difference and determine the field order according to magnitudes of the first difference and the second difference. The first difference is the difference between the top field image of a first frame on the timeline and the bottom field image of a second frame on the timeline. The second difference is the difference between the bottom field image of the first frame and the top field image of the second frame.

Two pairs of field images are prescribed such that different fields in different frames are formed into pairs from two frames. At this time, the time difference between the two field images that belong to one pair will without fail be higher than the time difference between the two field images that belong to the other pair. As a result, the difference between the two field images that belong to the pair having the higher time difference will normally be greater than the difference between the two field images that belong to the pair having the lower time difference.

Accordingly, assuming that the first frame belongs to an earlier time on the timeline than that to which the second frame belongs, if the field order is such that the top field image comes first, the first difference will normally be greater than the second difference. On the other hand, if the field order is such that the top field image comes last, the first difference will normally be less than the second difference. Here, in light of this point, the magnitude relationship between the first difference and the second difference is determined in order to determine the field order. This enables precisely determining the field order.

An image processing apparatus according to a seventh aspect of the present invention is the image processing apparatus according to any of the first to sixth aspects, wherein the deinterlacing unit is configured to generate, as the new frame, a frame that corresponds to at least one of the top field image and the bottom field image.

Here, as a result of deinterlacing, a frame that corresponds to at least either the top field image or the bottom field image is generated.

Note that the case of generating a frame that corresponds to the top field image and the bottom field image includes the case of generating one frame that corresponds to both of the top field image and the bottom field image, as well as the case of generating two frames that respectively correspond to the top field image and the bottom field image. Also, the case of generating a frame that corresponds to the top field image includes the case of using the top field image, as is, as a new frame, the case of generating an image by interpolating missing rows in the top field image without using the bottom field image, and the case of generating an image by interpolating missing rows in the top field image with use of the bottom field image. The same follows with the generation of a frame that corresponds to the bottom field image as well.

An image processing apparatus according to an eighth aspect of the present invention is the image processing apparatus according to any of the first to seventh aspects, wherein the deinterlacing unit is configured to generate, as the new frames, two frames that respectively correspond to the top field image and the bottom field image.

Here, as a result of deinterlacing, two frames that respectively correspond to the top field image and the bottom field image are generated. This prevents information that the original frame had from being missing in the new frame.

An image processing apparatus according to a ninth aspect of the present invention is the image processing apparatus according to the fifth aspect or the sixth aspect, wherein the deinterlacing unit is configured to generate, as the new frames, two frames that respectively correspond to the top field image and the bottom field image, and orders the two frames in accordance with the determined field order.

In other words, here, consistency in the arrangement of new frames on the timeline is maintained in accordance with the correct field order. As a result, on the timeline of the new frames, a moving subject moving straight forward is recorded such that it moves straight forward rather than being recorded such that it moves back and forth as it moves forward.

A recording medium storing an image processing program according to a tenth aspect of the present invention is a non-transitory computer-readable recording medium storing an image processing program that causes a computer to execute an interlacing determination step and a deinterlacing step. The interlacing determination step is a step of, by performing image processing on body data of a frame, determining whether or not the frame is an interlaced image. An interlaced image is an image that includes a top field image and a bottom field image at different times on a timeline. The deinterlacing step is a step of, in a case of a determination that the frame is an interlaced image, deinterlacing the frame and generating a new frame. Effects similar to those of the first aspect can be achieved with this aspect.

REFERENCE SIGNS LIST

1 Image processing apparatus (computer)
2 Image processing program
41 Image processing unit (deinterlacing unit)
43 Interlacing determination unit
44 Field order determination unit
$F_1, \ldots, F_K$ Target frame group (frames)
$O_1, \ldots, O_K$ Top field image group (top field images)
$E_1, \ldots, E_K$ Bottom field image group (bottom field images)
$H_1, \ldots, H_{2K}$ Progressive frame group (new frames)

DETAILED DESCRIPTION OF THE PREFERRED EMBODIMENTS

Hereinafter, an image processing apparatus and a recording medium storing an image processing program according to an embodiment of the present invention will be described with reference to the drawings.

1. Overview of Image Processing Apparatus

Figure 1:
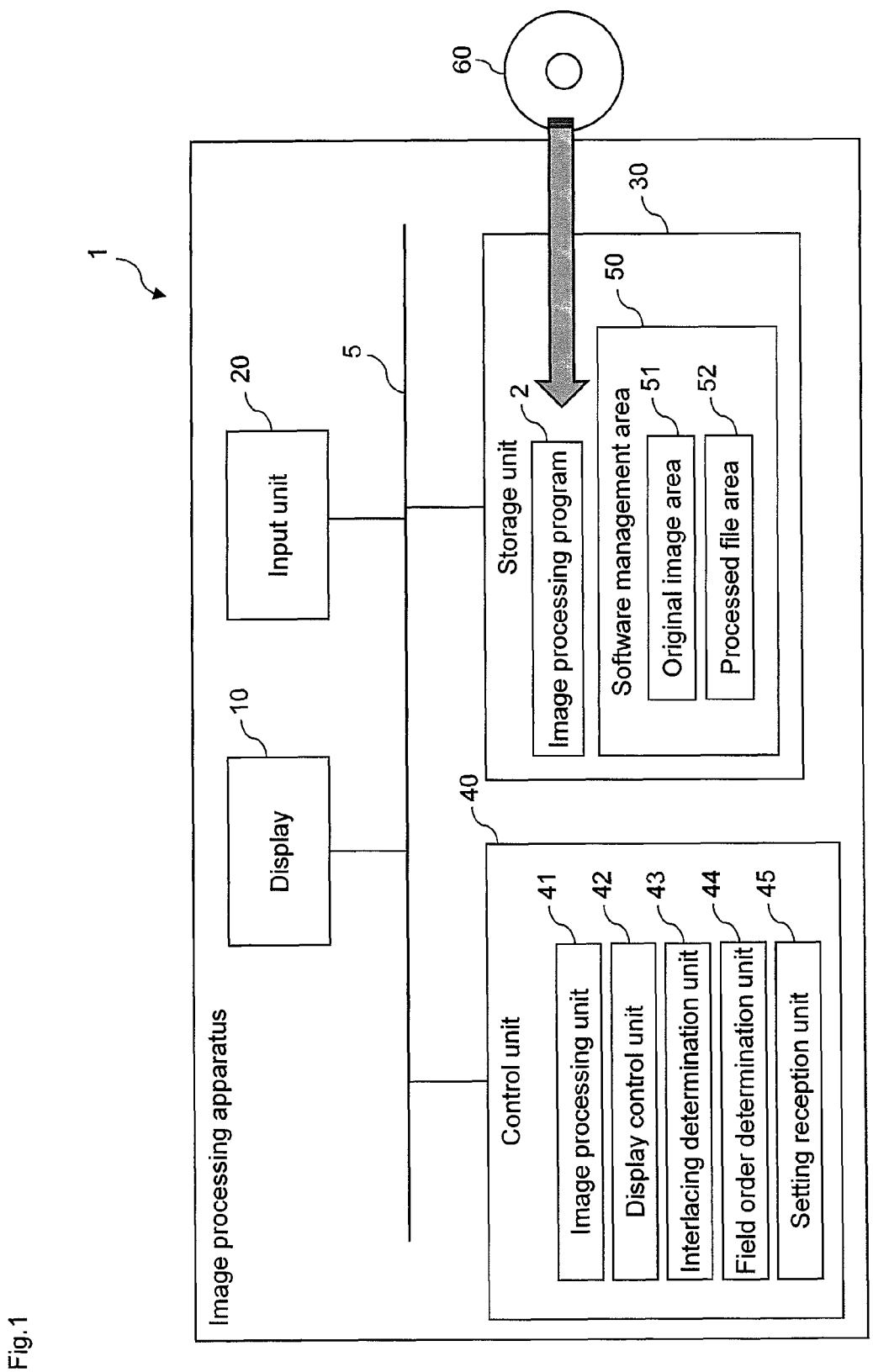
FIG. 1 is a block diagram of an image processing apparatus according to an embodiment of the present invention.

An image processing apparatus 1 shown in FIG. 1 is one embodiment of an image processing apparatus according to the present invention. The image processing apparatus 1 is a general-purpose personal computer. An image processing program 2 is provided and installed in the image processing apparatus 1 via, for example, a computer-readable recording medium 60 such as a CD-ROM that stores the image processing program 2. The image processing program 2 is application software for supporting image processing performed on moving images and still images. The image processing program 2 causes the image processing apparatus 1 to execute steps included in operations that will be described later.

The image processing program 2 has a function for deinterlacing interlaced images, as a function related to the present invention in particular. Here, an interlaced image is an image that includes a top field image and a bottom field image that belong to different times on a timeline. Accordingly, there is a time lag between the times when a top field image and a bottom field image included in the same interlaced image were captured. The deinterlacing function of the image processing program 2 is a function for generating a progressive image by removing interlace striping, which is caused by this time lag, from an interlaced image.

The image processing apparatus 1 has a display 10, an input unit 20, a storage unit 30, and a control unit 40. The display 10, the input unit 20, the storage unit 30, and the control unit 40 can appropriately communicate with each other due to being connected to each other via a bus line or cable 5, for example. In the present embodiment, the display 10 is a liquid crystal display. The input unit 20 is configured by a mouse, a keyboard and the like. The storage unit 30 is configured by hard disk or the like. The control unit 40 is configured by a CPU, a ROM, a RAM, and the like. The display 10 displays later-described screens and the like to a user. The input unit 20 receives operations performed by the user on the image processing apparatus 1.

The image processing program 2 is stored in the storage unit 30. A software management area 50 is secured in the storage unit 30. The software management area 50 is an area used by the image processing program 2. An original image area 51 and a processed file area 52 are secured in the software management area 50. The roles of these areas 51 and 52 will be described later.

The control unit 40 operates in a virtual manner as an image processing unit 41, a display control unit 42, an interlacing determination unit 43, a field order determination unit 44, and a setting reception unit 45, by reading out and executing the image processing program 2 stored in the storage unit 30. The operations of the units 41 to 45 will be described later.

Figure 2:
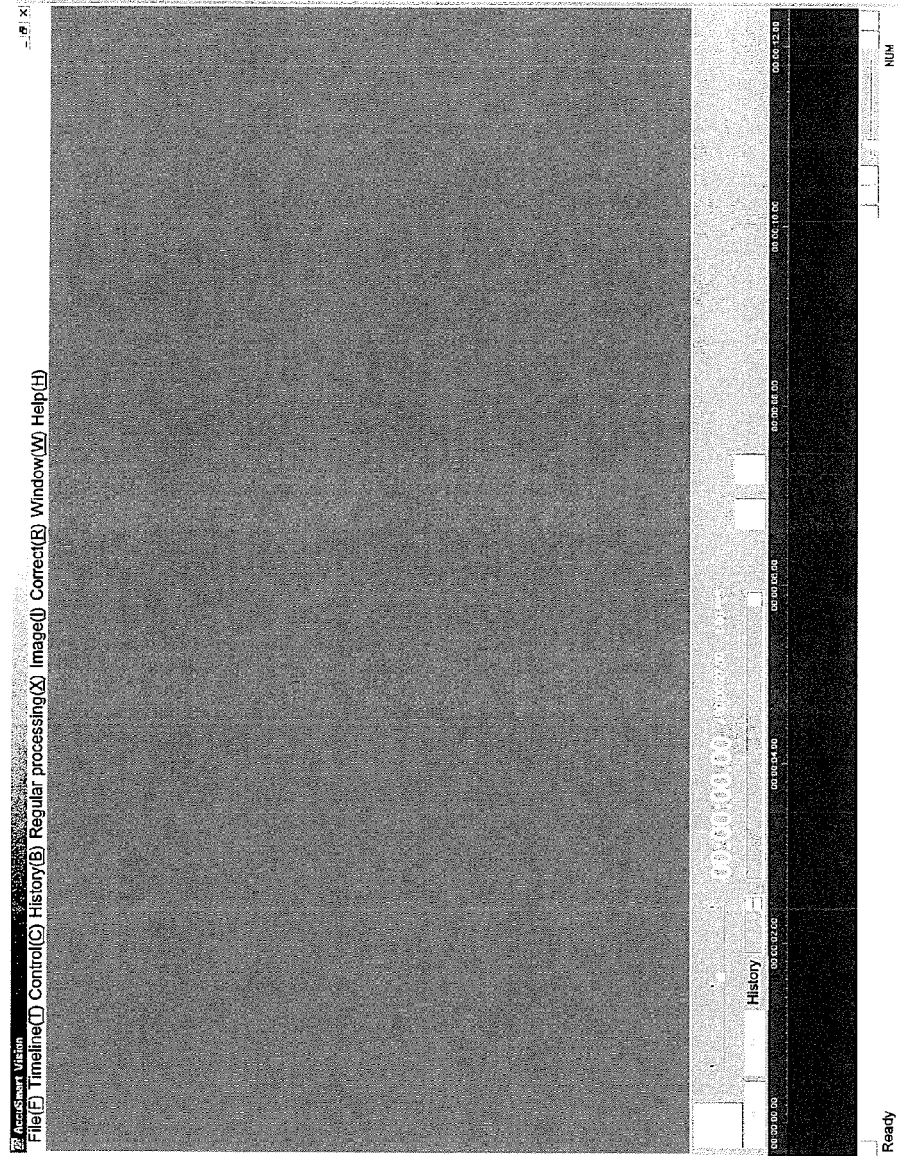
FIG. 2 is a diagram of a basic screen before image data is imported.

2. Detailed Description of Configuration and Operations of Image Processing Apparatus The control unit 40 starts the image processing program 2 upon detecting that the user has performed a predetermined operation via the input unit 20. When the image processing program 2 has been started, a basic screen W1 (see FIG. 2) is displayed on the display 10. Note that the display control unit 42 controls the display of screens, windows, buttons and all other elements that are displayed on the display 10.

2-1. Import of Image Data

The basic screen W1 receives an instruction to import image data to the original image area 51 from a user. Image data imported to the original image area 51 is targeted for later-described playback processing and image processing. The control unit 40 imports image data to the original image area 51 from a still image file or a moving image file. Note that in this specification, still image files are data files in a still image format, and moving image files are data files in a moving image format.

In the case of importing image data from a still image file, the user designates one still image file or one folder by operating the input unit 20. In the case of the former, the control unit 40 prompts the user to input a filename and an address path in the storage unit 30 for that still image file. In the case of the latter, the control unit 40 prompts the user to input a folder name and an address path in the storage unit 30 for that folder. Thereafter, the control unit 40 saves the designated still image file or all the still image files in the designated folder as a group of still image files in the original image area 51. Note that as will be described later, if still image files that are the import source of a group of still image files originate from interlaced images, the group of still image files saved in the original image area 51 can become a deinterlaced group of still image files. Note that the term "group" used in this specification is not limited to being made up of multiple elements, and may be made up of one element.

On the other hand, in the case of importing image data from a moving image file, the user inputs a filename and an address path in the storage unit 30 for that one moving image file by operating the input unit 20. The display control unit 42 displays a moving image import window (not shown) in a superimposed manner on the basic screen W1 upon detecting that the user designated a moving image file. The moving image import window receives the selection of a segment of arbitrary length from the user, out of the entire segment of the timeline of the designated moving image file. Upon detecting that the user selected a specific segment via the input unit 20, the control unit 40 generates a group of still image files that corresponds to the group of frames included in that segment of the designated moving image file. Thereafter, the control unit 40 saves this group of still image files in the original image area 51. Note that at this time, if the moving image file that is the import source of the group of still image files originates from interlaced images, the group of still image files saved in the original image area 51 can become a deinterlaced group of still image files.

Accordingly, in the present embodiment, the image data targeted for later-described playback processing and image processing is not a moving image file, but rather still image files, and still image files are imported to the original image area 51 in units of files or folders, or in units of the entire segment or partial segments of a moving image file.

Note that even if a group of still image files imported to the original image area 51 originates from still image files rather than from a moving image file, the control unit 40 recognizes the still image files included in the group as being still image files that are arranged in a timeline. The arrangement is automatically determined based on file attributes (filename, created on date/time, updated on date/time, or the like).

2-2. Playback Processing with Respect to a Group of Still Image Files

When a group of still image files is imported to the original image area 51, the display control unit 42 displays a display window W2 (see FIG. 3) in a superimposed manner on the basic screen W1. The number of display windows W2 that are created is the same as the number of timelines in the group of still image files that was imported to the original image area 51.

First, one still image file included in the group of still image files imported to the original image area 51 (e.g., the still image file corresponding to the first frame on the timeline) is displayed in the display window W2. Thereafter, the frame that is displayed in the display window W2 is switched upon receiving a user operation, as will be described later.

Figure 3:
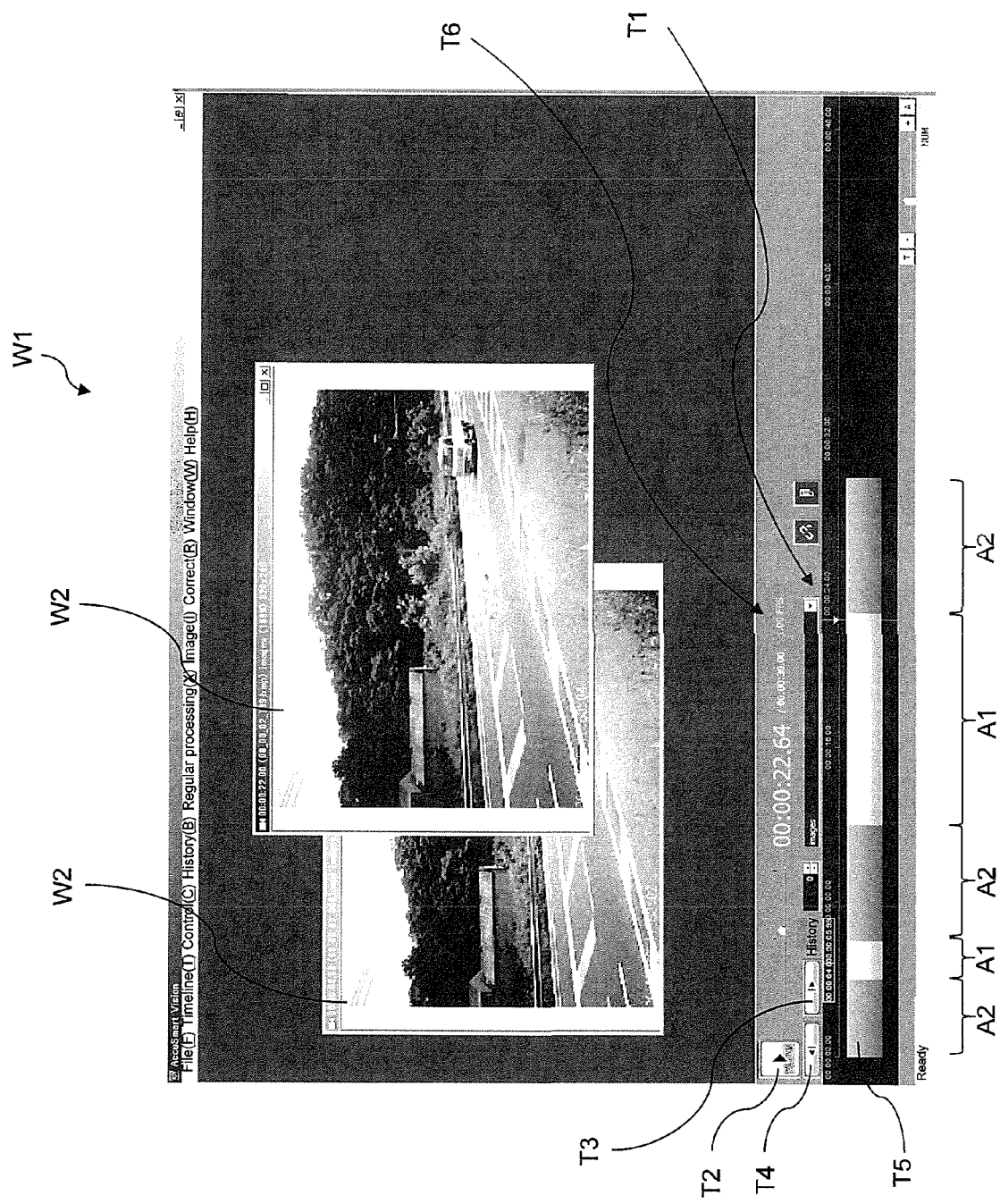
FIG. 3 is a diagram of a basic screen after image data is imported.

The group of frames that belong to the timeline corresponding to the display window W2 can be played back as a moving image in that display window W2 by the display control unit 42. Here, as shown in FIG. 3, a window selection pull-down menu T1, a play button T2, a frame advance button T3, a frame reverse button T4, a timeline bar T5, and an FPS setting area T6 are arranged on the basic screen W1.

Even if there are multiple display windows W2, there is only one active display window W2. The window selection pull-down menu T1 receives a user selection of which display window W2 is to be made active. Hereinafter, the timeline that corresponds to the active display window W2 is referred to as the active timeline, and frame group that belongs to the active timeline is referred to as the active frame group. Also, the frame currently displayed in the active display window W2 is referred to as the active display frame.

The play button T2 receives a user instruction to play back the active frame group as a moving image. Upon detecting that the user has pressed the play button T2 via the input unit 20, the display control unit 42 displays the frames included in the active frame group sequentially along the timeline in the active display window W2 in a frame advance format. Note that playback starts from the active display frame at the point in time when the play button T2 is pressed. Also, the play button T2 receives a user instruction to stop playback. Upon detecting that the user has pressed the play button T2 via the input unit 20 during playback, the display control unit 42 fixes the display in the active display window W2 to the active display frame at that point in time.

The frame advance button T3 and the frame reverse button T4 respectively receive user instructions to switch the active display frame to the next frame and the previous frame along the active timeline.

The timeline bar T5 is an object that diagrammatically represents the active timeline. The timeline bar T5 is partitioned into equal areas in the direction in which the bar extends, the number of areas being the same as the number of frames in the active frame group. An nth partitioned area from the left on the timeline bar T5 corresponds to the nth frame on the active timeline (where n is a natural number).

As shown in FIG. 3, partitioned areas A1 corresponding to the selected frame group and partitioned areas A2 corresponding to a non-selected frame group are displayed in a different manner in the timeline bar T5. The selected frame group is the frame group that corresponds to the segment that is currently selected on the active timeline. The non-selected frame group is the frame group that corresponds to the segment that is not currently selected on the active timeline.

The timeline bar T5 receives a user selection of an arbitrary segment on the active timeline. In other words, by operating a partitioned area on the timeline bar T5 via the input unit 20, the user can select an arbitrary number of frames in the active frame group. The image processing unit 41 recognizes the selected frame group as being the target of later-described image processing. Note that each time a partitioned area on the timeline bar T5 is selected by the user, the active display frame is switched to the frame that corresponds to the most recently selected partitioned area.

The FPS setting area T6 displays the frame rate in playback of the active frame group as a moving image, and also receives a change to the frame rate from the user.

2-3. Image Processing

Hereinafter, image processing with respect to a selected frame group will be described. The image processing unit 41 can execute multiple image processing modules such as noise removal, sharpness, brightness/contrast/chroma adjustment, image resolution adjustment, rotation, and the addition of characters/arrows/mosaic. The image processing modules are incorporated in the image processing program 2.

By operating the basic screen W1 via the input unit 20, the user can select any of the image processing modules any number of times in any order. Each time the image processing unit 41 detects that the user selected an image processing module, it executes that image processing module on the selected frame group. Note that the execution of an image processing module on a selected frame group refers to the execution of that image processing module on each frame included in that selected frame group.

As an image processing module is successively executed on a frame one time, two times, three times, and so on, that frame is successively subjected to first-order processing, second-order processing, third-order processing, and so on. The 0-order frame corresponds to the still image file that is saved in the original image area 51. The (m+1)-order frame (where m is an integer greater than or equal to 0) corresponds to the still image file obtained when an image processing module is executed one time on the still image file that corresponds to the m-order frame. The image processing unit 41 successively generates still image files that correspond to the first-order frame and subsequent-order frames, and saves those still image files individually in the processed file area 52.

Figure 4:
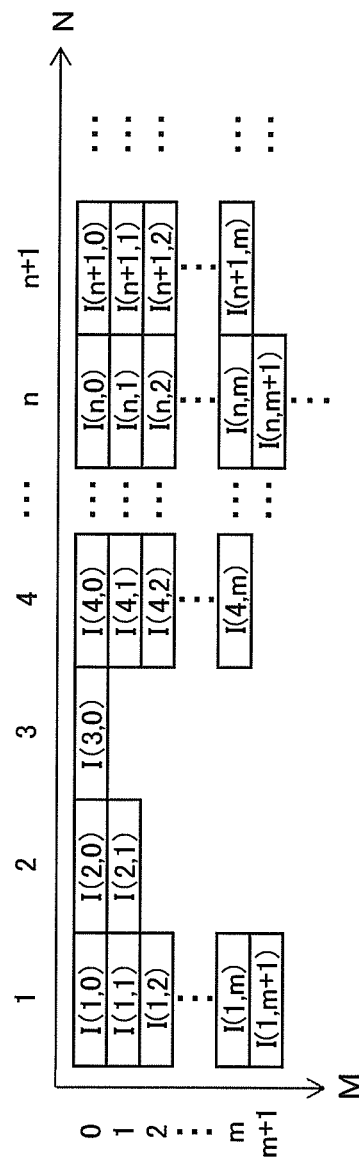
FIG. 4 is a diagram showing a group of still images belonging to one timeline.

FIG. 4 is a conceptual diagram showing how a group of still images belonging to one timeline is managed by the image processing program 2. In FIG. 4, an N axis, which is the horizontal axis, represents the order of the frames on the timeline, and an M axis, which is the vertical axis, represents the order of processing. The box corresponding to the coordinates (n,m) in an N-M space in FIG. 4 represents the still image I(n,m). The still image I(n,m) is the m-order still image of the n-th frame on the timeline (where n is a natural number, and m is an integer greater than or equal to 0).

For each frame, the control unit 40 manages the value of the currently selected coordinate m as a parameter $m_s$. Immediately after a group of still image files is imported to the original image area 51, the coordinate $m_s$ is the initial value of 0. Thereafter, each time an image processing module is executed one time, the coordinate $m_s$ of that frame is incremented by one. Also, by performing a predetermined operation via the input unit 20, the user can freely change the coordinate $m_s$ of the selected frame group. Note that the execution of an image processing module on a frame refers to the execution of that image processing module on the $m_s$-order still image of that frame. Accordingly, changing the coordinate $m_s$ has the significance of changing the execution target of an image processing module.

Incidentally, the display of a frame refers to the display of the still image that has the coordinate $m_s$ of that frame. Accordingly, changing the coordinate $m_s$ also has the significance of changing the target of display in the active display window W2.

2-4. Deinterlacing Processing and De-Squeeze Processing

Next, deinterlacing processing and de-squeeze processing will be described. Deinterlacing processing and de-squeeze processing are processes that are automatically executed in processing for importing a group of still image files to the original image area 51 (referred to hereinafter as "data import processing").

As described above, at the start of data import processing, the user designates image data that is to be the import source of a group of still image files (referred to hereinafter as the "target image data"). Deinterlacing processing is processing in which it is determined whether or not the group of frames included in the target image data designated by the user (referred to hereinafter as the "group of target frames") is an interlaced image group, and automatically deinterlacing the group of target frames if it is determined to be an interlaced image group. Note that deinterlacing processing is executed if a deinterlace setting is set to ON, and is skipped if the deinterlace setting is set to OFF.

On the other hand, de-squeeze processing is processing in which it is determined whether or not the group of target frames has a predetermined image size, and the group of target frames is automatically enlarged horizontally if it is determined that the group of target frames has the predetermined image size. Also, similarly to deinterlacing processing, de-squeeze processing is executed only if a de-squeeze setting is set to ON.

The following describes processing for setting deinterlace setting and de-squeeze setting to ON/OFF, and then describes details of data import processing, including deinterlacing processing and de-squeeze processing.

2-4-1. Deinterlace Setting and De-Squeeze Setting

Figure 5:
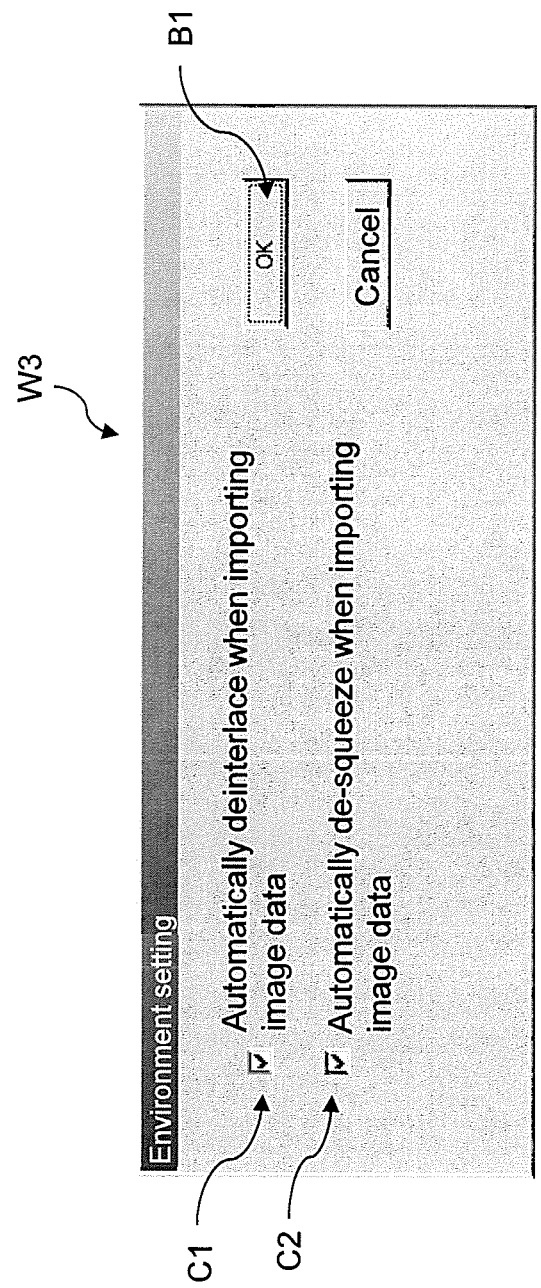
FIG. 5 is a diagram of an environment setting window.

Upon detecting that the user performed a predetermined operation via the input unit 20, the display control unit 42 displays an environment setting window W3 (see FIG. 5) in a superimposed manner on the basic screen W1. The environment setting window W3 receives ON/OFF settings for the deinterlace setting and the de-squeeze setting from the user.

Specifically, if the user presses an OK button B1 on the environment setting window W3 while the selection box of a setting area C1 on the same environment setting window W3 is checked, that fact is detected by the setting reception unit 45, and a deinterlace setting flag is set to "1". Similarly, if the user presses the OK button B1 while the selection box of the setting area C1 is unchecked, that fact is detected by the setting reception unit 45, and the deinterlace setting flag is set to "0". Note that the deinterlace setting flag is a flag that indicates whether the deinterlace setting is ON or OFF, and is managed in a predetermined area in the software management area 50.

In the de-squeeze setting as well, similarly, if the user presses the OK button B1 while the selection box of a setting area C2 on the environment setting window W3 is checked/unchecked, that fact is detected by the setting reception unit 45, and a de-squeeze setting flag is set to "1"/"0". The de-squeeze setting flag is a flag that indicates whether the de-squeeze setting is ON or OFF, and is managed in a predetermined area in the software management area 50 similarly to the deinterlace setting flag.

2-4-2. Details of Data Import Processing

Figure 6:
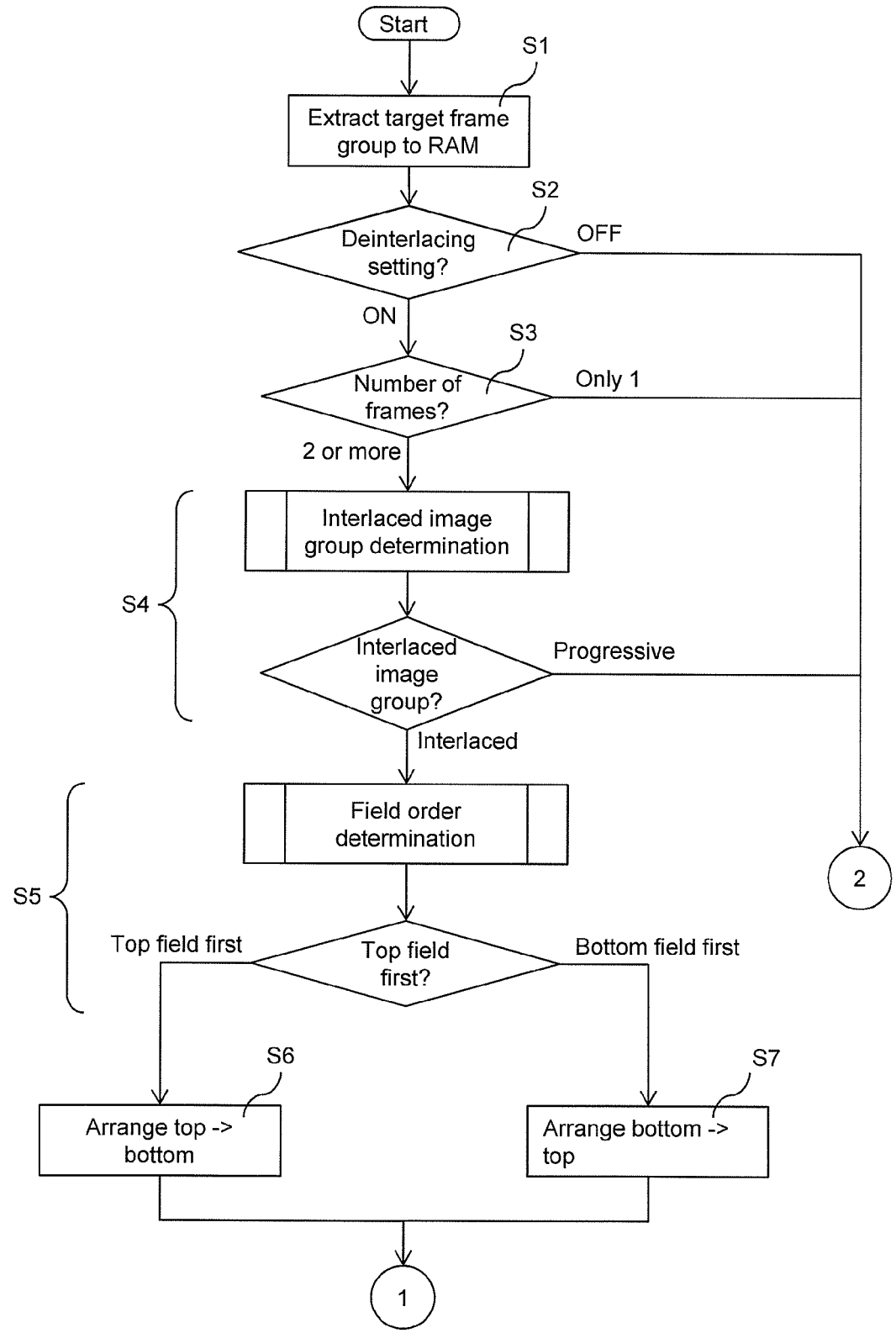
FIG. 6 is a flowchart showing the flow of data import processing.
Figure 7:
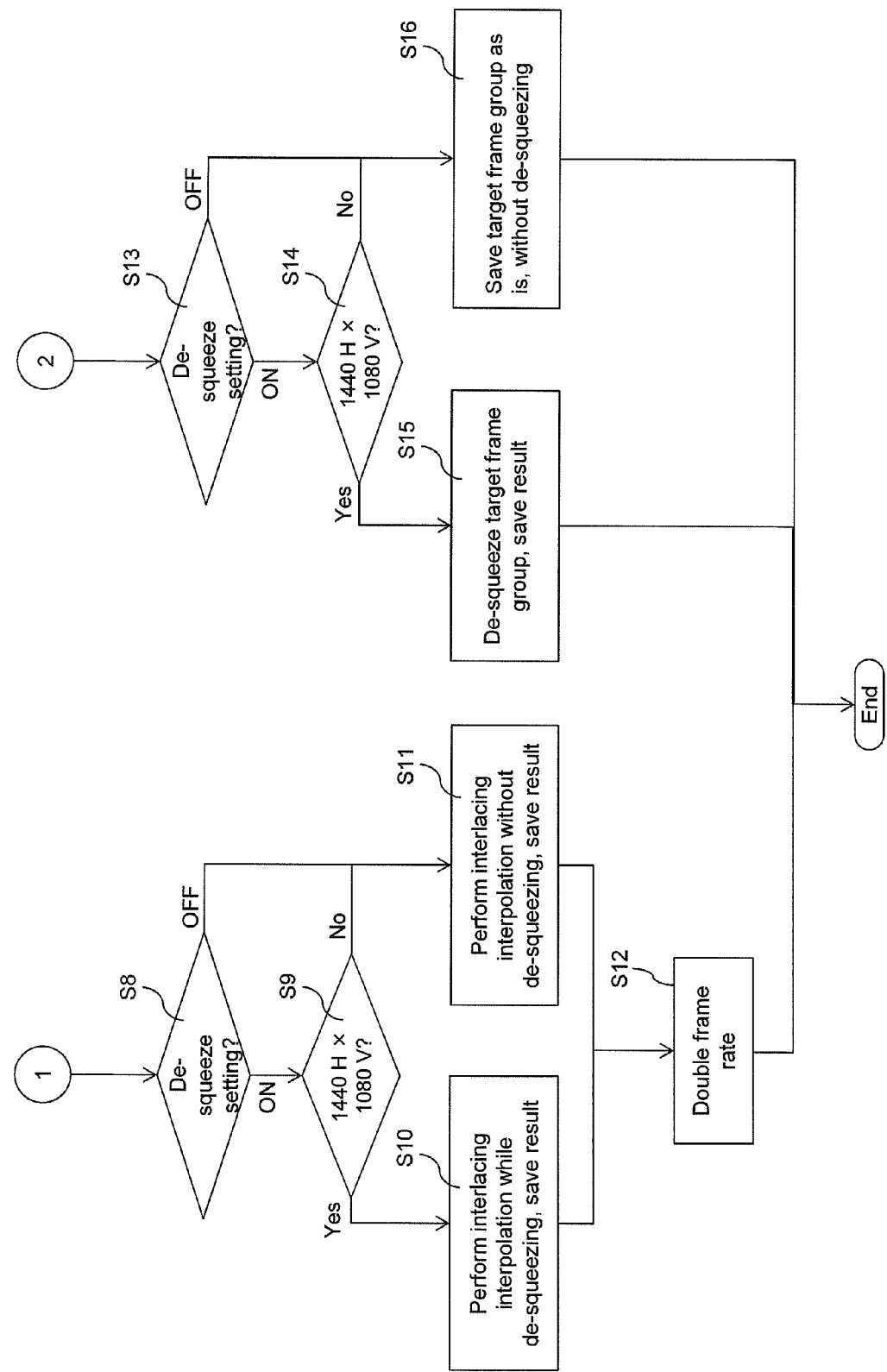
FIG. 7 is a flowchart showing a continuation of the flow of data import processing in FIG. 6.

The following describes details of data import processing with reference to FIGS. 6 and 7. Note that as described above, data import processing starts when the user has designated target image data via the input unit 20 and furthermore input an instruction to import it.

First, in step S1, the image processing unit 41 decodes the target image data and extracts a group of target frames to the RAM.

Next, in step S2, the interlacing determination unit 43 references the deinterlace setting flag and determines whether or not deinterlacing processing pertaining to steps S3 to S12 is to be executed. Here, if the value of the deinterlace setting flag is "1", processing moves to step S3. On the other hand, if the value is "0", processing moves to step S13, and steps S3 to S12 pertaining to deinterlacing processing are skipped.

Next, in step S3, the interlacing determination unit 43 determines whether or not two or more frames are included in the group of target frames. If it is determined that two or more frames are included in the group of target frames, processing moves to step S4. On the other hand, if it is determined that only one frame is included in the group of target frames, processing moves to step S13, and the remaining steps S4 to S12 pertaining to deinterlacing processing are skipped. Note that the reason for making this determination here is that two or more target frames are necessary in the remaining steps S4 to S12 pertaining to deinterlacing processing. Hereinafter, a group of target frames $F_1, \ldots, F_K$ will refer to a group of target frames made up of K frames (where K is an integer greater than or equal to 1). Note that it is assumed that the target frames $F_1, \ldots, F_K$ are arranged in that order on the timeline.

Next, in step S4, the interlacing determination unit 43 determines whether or not the group of target frames $F_1, \ldots, F_K$ is an interlaced image group by performing image processing on the body data of the group of target frames $F_1, \ldots, F_K$. An algorithm for determining whether or not the group of target frames $F_1, \ldots, F_K$ is an interlaced image group (see FIG. 8) will be described later. Here, if it was determined that the group of target frames $F_1, \ldots, F_K$ is an interlaced image group, processing moves to step S5. On the other hand, if it was determined that the group of target frames $F_1, \ldots, F_K$ is a non-interlaced image group (progressive image group), processing moves to step S13, and the remaining steps S5 to S12 pertaining to deinterlacing processing are skipped.

In step S5, the field order determination unit 44 determines the field order of the group of target frames $F_1, \ldots, F_K$ by performing image processing on the body data of the group of target frames $F_1, \ldots, F_K$. An algorithm for determining the field order of the group of target frames $F_1, \ldots, F_K$ (see FIG. 9) will be described later. Note that the field order is the order of the top field image and the bottom field image included in the same frame on the timeline. Accordingly, the top field image was captured first if the field order is "top field first", and the bottom field image was captured first if the field order is "bottom field first". Here, processing moves to step S6 if it is determined that the field order is "top field first", and processing moves to step S7 if it is determined that the field order is "bottom field first".

In step S6 and step S7, the image processing unit 41 arranges K top field images $O_1, \ldots, O_K$ and K bottom field images $E_1, \ldots, E_K$ included in the group of target frames $F_1, \ldots, F_K$ on the timeline. Specifically, in step S6, which is executed after it was determined that the field order is "top field first", these images are arranged in the order of $O_1, E_1, O_2, E_2, \ldots, O_K, E_K$. On the other hand, in step S7, which is executed after it was determined that the field order is "bottom field first", these images are arranged in the order of $E_1, O_1, E_2, O_2, \ldots, E_K, O_K$. Hereinafter, for the sake of convenience in the description, a group of field images $G_1, \ldots, G_{2K}$ will refer to the group of 2K arranged field images $O_1, E_1, O_2, E_2, \ldots, O_K, E_K$ or arranged field images $E_1, O_1, E_2, O_2, \ldots, E_K, O_K$. It is assumed that the field images $G_1, \ldots, G_{2K}$ are arranged in that order on the timeline.

When step S6 and step S7 end, processing moves to step S8. In step S8, the image processing unit 41 references the de-squeeze setting flag and determines whether or not de-squeeze processing pertaining to steps S9 and S10 is to be executed. Here, if the value of the de-squeeze setting flag is "1", processing moves to step S9. On the other hand, if the value is "0", processing moves to step S11, and steps S9 and S10 pertaining to de-squeeze processing are skipped.

In step S9, the image processing unit 41 determines whether or not the image size of the group of target frames $F_1, \ldots, F_K$ is 1440 pixels horizontally×1080 pixels vertically. Processing moves to step S10 if the image size of the group of target frames $F_1, \ldots, F_K$ is the above-described size, and moves to step S11 if it is not the above-described size. Note that this determination is performed here in order to determine whether or not the group of target frames $F_1, \ldots, F_K$ (more accurately, the group of field images $G_1, \ldots, G_{2K}$) needs to undergo de-squeezing. Specifically, if a group of target frames $F_1, \ldots, F_K$ is recorded in the image size of 1440 pixels horizontally×1080 pixels vertically (4:3 aspect ratio), there is a high possibility that they are images that were originally captured for the purpose of full high-definition display at 1920 pixels horizontally×1080 pixels vertically (16:9 aspect ratio), but were recorded in the image size of 1440 pixels horizontally×1080 pixels vertically (4:3 aspect ratio) for a purpose such as reducing the data capacity. As a result, if that group of target frames $F_1, \ldots, F_K$ is played back without undergoing de-squeezing, the subject in the obtained video will be horizontally compressed at the ratio 1440/1920 (=3/4) in comparison to reality. Accordingly, it is desirable to de-squeeze image data that has 1080 pixels vertically and has an aspect ratio of 4:3.

In light of this point, in step S10 that is executed if de-squeezing is necessary, interlacing interpolation is performed on the group of field images $G_1, \ldots, G_{2K}$ while the image size of the group of field images $G_1, \ldots, G_{2K}$ is enlarged from 1440 pixels horizontally to 1920 pixels horizontally. On the other hand, in step S11 that is executed if de-squeezing is not necessary, interlacing interpolation is performed on the group of field images $G_1, \ldots, G_{2K}$ without changing the horizontal image size of the group of field images $G_1, \ldots, G_{2K}$. Note that in either case, in steps S10 and S11, a group of 2K new frames (referred to hereinafter as the "group of progressive frames") $H_1, \ldots, H_{2K}$ is generated in correspondence with the group of 2K field images $G_1, \ldots, G_{2K}$. In other words, in steps S10 and S11, the group of target frames $F_1, \ldots, F_K$ is deinterlaced.

More specifically, in step S10, for each field image included in the group of field images $G_1, \ldots, G_{2K}$, the image processing unit 41 interpolates pixel data at the ratio of one column per three columns in order to enlarge the horizontal image size from 1440 pixels to 1920 pixels, while also interpolating pixel data for missing rows at the ratio of one row per two rows. It should be noted that, normally, if the values of pixel data are determined by interpolation in the horizontal direction, and then the resulting pixel data is interpolated in the vertical direction, interpolated pixel data is being further used in other pixel data interpolation, and image degradation will become noticeable. The same is also true for the case where the values of pixel data are determined by interpolation in the vertical direction, and then the resulting pixel data is interpolated in the horizontal direction. However, since vertical interpolation and horizontal interpolation are performed at the same time in step S10, it is possible to prevent interpolated pixel data from being further used in other pixel data interpolation. In step S10, pixel data is interpolated using only the pixel data that originally existed in the field image that includes that pixel data, and not using pixel data that was generated by interpolation and did not originally exist.

A group of 2K still image files that respectively correspond to the 2K progressive frames $H_1, \ldots, H_{2K}$ is saved in the original image area 51 by the image processing unit 41. When step S10 ends, processing moves to step S12.

On the other hand, in step S11, for each of the field images included in the group of field images $G_1, \ldots, G_{2K}$, the image processing unit 41 interpolates pixel data for missing rows without changing the horizontal image size. Thereafter, similarly to step S10, a group of 2K still image files that respectively correspond to the 2K progressive frames $H_1, \ldots, H_{2K}$ is saved in the original image area 51 by the image processing unit 41. When step S11 ends, processing moves to step S12.

Note that the algorithm for pixel data interpolation used in steps S10 and S11 can be appropriately selected from among known technology such as a nearest neighbor, bilinear, and bicubic algorithms. Also, although pixel data is interpolated using pixel data included in the same image in the present embodiment, pixel data included in another image may be used. In this case, it is preferable to use pixel data included in an adjacent or nearby image in the arrangement of the field images $G_1, \ldots, G_{2K}$ that was determined in step S6 or S7. At this time, pixel data included in the other field image of the same frame may be used, pixel data included in the same field or other field image of a different frame may be used, or any combination of these may be used.

Next, in step S12, the image processing unit 41 calculates the frame rate of the group of progressive frames $H_1, \ldots, H_{2K}$. Specifically, in the present embodiment, deinterlacing the group of target frames $F_1, \ldots, F_K$ results in the generation of a group of twice as many frames, and therefore the image processing unit 41 sets the result of doubling the frame rate of the group of target frames $F_1, \ldots, F_K$ as the frame rate of the group of progressive frames $H_1, \ldots, H_{2K}$. Note that the frame rate of the group of target frames $F_1, \ldots, F_K$ is specified by, for example, referencing a value recorded as metadata in the target image data. When step S12 ends, data import processing ends.

Next, step S13 will be described. Step S13 is a step that, as described above, is executed if it is determined that the deinterlace setting is "OFF" (step S2), if it is determined that only one frame is included in the group of target frames $F_1, \ldots, F_K$ (step S3), or if it is determined that the group of target frames $F_1, \ldots, F_K$ is a group of progressive images (step S4). In step S13, similarly to step S8, the image processing unit 41 references the de-squeeze setting flag and determines whether or not de-squeeze processing pertaining to steps S14 and S15 is to be executed. Here, processing moves to step S14 if the value of the de-squeeze setting flag is "1", and moves to step S16 if the value is "0".

Next, in step S14, similarly to step S9, the image processing unit 41 determines whether or not the image size of the group of target frames $F_1, \ldots, F_K$ is 1440 pixels horizontally× 1080 pixels vertically, whereafter processing moves to step S15 if the image size of the group of target frames $F_1, \ldots, F_K$ is the above-described size, and moves to step S16 if it is not the above-described size.

In step S15, similarly to step S10, for each frame included in the group of target frames $F_1, \ldots, F_K$, the image processing unit 41 interpolates pixel data at the ratio of one column per three columns in order to enlarge the horizontal image size from 1440 pixels to 1920 pixels. Note that step S15 is executed due to it being the case where the group of target frames $F_1, \ldots, F_K$ is not a group of interlaced images, it is not possible to determine whether or not it is a group of interlaced images, or the user does not desire deinterlacing, and therefore vertical interpolation is not executed. When de-squeezing is complete, a group of K still image files that respectively correspond to K target frames $F_1, \ldots, F_K$ is saved in the original image area 51 by the image processing unit 41. When step S15 ends, data import processing ends.

On the other hand, in step S16, the image processing unit 41 saves the group of K target frames $F_1, \ldots, F_K$, as is, as a group of K still image files in the original image area 51. When step S16 ends, data import processing ends.

2-4-3. Interlacing Detection Processing

Next, processing for determining whether or not the group of target frames $F_1, \ldots, F_K$ is an interlaced image group (referred to hereinafter as "interlacing detection processing"), which is included in step S4 described above, will be described with reference to FIG. 8.

First, in step S21, the interlacing determination unit 43 specifies L pairs of frames having the highest degrees of change from among pairs of adjacent frames on the timeline in the group of target frames $F_1, \ldots, F_K$. Note that L is a predetermined value (e.g., 5), and if the predetermined value is larger than (K−1), (K−1) is used.

Specifically, the interlacing determination unit 43 generates (K−1) difference images $P_1, \ldots, P_{K-1}$ from the group of K target frames $F_1, \ldots, F_K$. Here, difference image $P_1$ refers to the difference image that is the difference between the frame $F_i$ and the frame $F_{i+1}$ (i=1, 2, ..., K−1), and each pixel is generated by subtracting the pixel value of that pixel in the frame $F_{i+1}$ from the pixel value of the same pixel in the frame $F_i$. Note that difference images are frequently calculated below, and it is assumed that they are calculated using a similar method. Next, for each difference image $P_i$ included in the difference images $P_1, \ldots, P_{K-1}$, the interlacing determination unit 43 calculates a degree of difference $D_i$ by adding up the absolute values of all of the pixel values. The degree of difference $D_i$ is an index representing the degree of change between the frame $F_i$ and the frame $F_{i+1}$. The interlacing determination unit 43 then selects L degrees of difference $D_i$ having the highest values from among the (K−1) degree of differences $D_1, \ldots, D_{K-1}$, and specifies the L pairs of frames $F_i, F_{i-1}$ that respectively correspond to the L degrees of difference $D_i$.

Next, the interlacing determination unit 43 repeatedly performs steps S22 to S25 on each frame pair included in the L pairs of frames that were specified in step S21. The following describes how steps S22 to S25 are executed on one pair of frames $F_I, F_{I+1}$, with reference to FIG. 10. Note that FIG. 11A shows an example of the frame $F_I$, which is an interlaced image, and FIG. 11B shows an example of the frame $F_I$, which is a progressive image.

Figure 12A:
FIG. 12A is a diagram showing an example of another frame that is generated in interlacing detection processing performed on an interlaced image.
Figure 12B:
FIG. 12B is a similar diagram in the case of a progressive image.

First, in step S22, the interlacing determination unit 43 separates the frame $F_I$ into a top field image $O_I$ and a bottom field image $E_I$. Next, the interlacing determination unit 43 performs interlacing interpolation on the field images $O_I$ and $E_I$ with a method similar to that in steps S10 and S11, and thus generates frames $O_I'$ and $E_I'$. The interlacing determination unit 43 also similarly generates two frames $O_{I+1}'$ and $E_{I+1}'$ from the frame $F_{I+1}$ (see arrow a1 in FIG. 10). Note that FIG. 12A shows an example of the frame $O_I'$ in the case where the frame $F_I$ is an interlaced image, and FIG. 12B shows an example of the frame $O_I'$ in the case where the frame $F_I$ is a progressive image.

Figure 10:
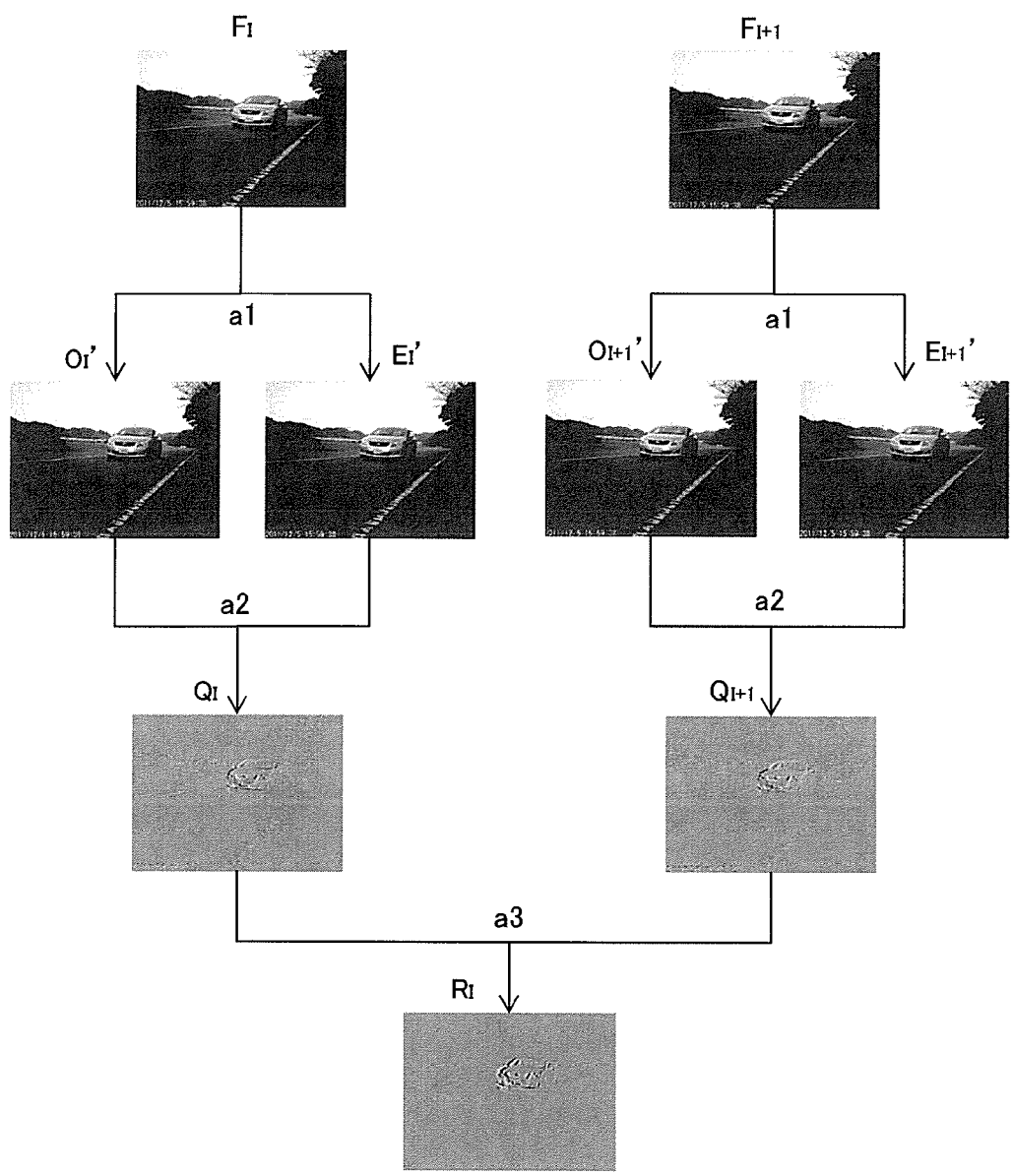
FIG. 10 is a conceptual diagram showing an algorithm for interlacing detection processing.
Figure 11A:
FIG. 11A is a diagram showing an example of an interlaced image.
Figure 11B:
FIG. 11B is a diagram showing an example of a progressive image.
Figure 13A:
FIG. 13A is a diagram showing an example of another frame that is generated in interlacing detection processing performed on an interlaced image.
Figure 13B:
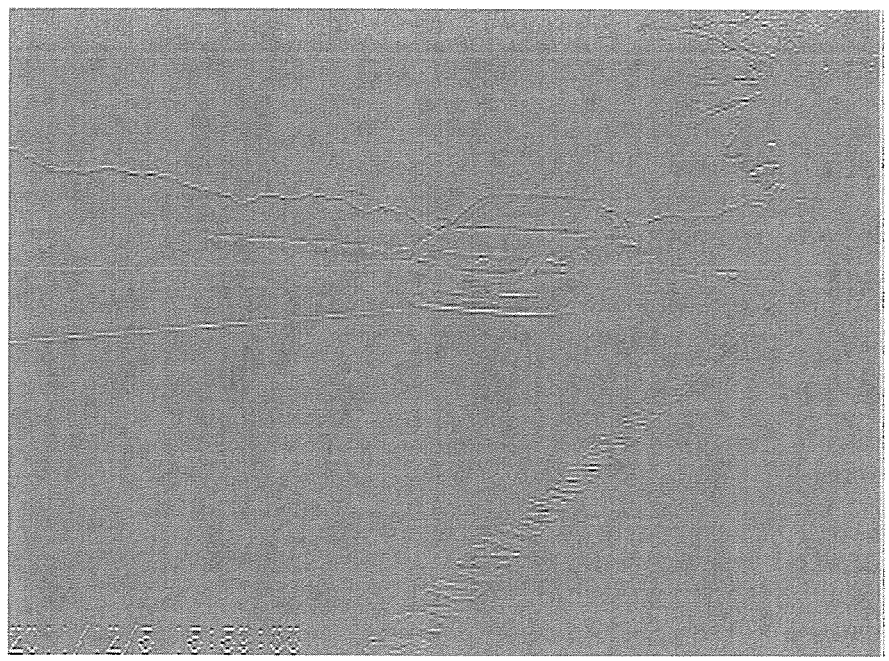
FIG. 13B is a similar diagram in the case of a progressive image.

Next, in step S23, the interlacing determination unit 43 generates a difference image $Q_I$ that is the difference between the frame $O_I'$ and the frame $E_I'$, and a difference image $Q_{I+1}$ that is the difference between the frame $O_{I+1}'$ and the frame $E_{I+1}'$ (see arrow a2 in FIG. 10). Note that FIG. 13A shows an example of the difference image $Q_I$ in the case where the frame $F_I$ is an interlaced image, and FIG. 13B shows an example of the difference image $Q_I$ in the case where the frame $F_I$ is a progressive image.

Here, in the case where the frame $F_I$ is an interlaced image, a time lag exists between the time to which the top field image $O_I$ belongs and the time to which the bottom field image $E_I$ belongs. Accordingly, if there is a subject that is moving in the frame $F_I$ (moving subject), that movement of the subject will be reflected in the difference image $Q_I$ resulting from the comparison of the frame $O_I'$, which is obtained by subjecting the top field image $O_I$ to interlacing interpolation, and the frame $E_I'$, which is obtained by subjecting the bottom field image $E_I$ to interlacing interpolation. The same follows for the difference image $Q_{I+1}$ as well. In other words, step S23, in which the difference images $Q_I$ and $Q_{I+1}$ are generated, is a step for highlighting the existence of a moving subject in the difference images $Q_I$ and $Q_{I+1}$ so as to enable determining whether or not the frames $F_I$ and $F_{I+1}$ are an interlaced image. Note that although the difference images $Q_I$ and $Q_{I+1}$ are the differences between the frames $O_I'$, $O_{I+1}'$ and the frames $E_I'$, $E_{I+1}'$ in the present embodiment, similar effects are expected even if they are respectively the differences between the top field images $O_I$, $O_{I+1}$ and the bottom field images $E_I$, $E_{I+1}$ that have not yet been subjected to interlacing interpolation.

Incidentally, as described above, the difference images $Q_I$ and $Q_{I+1}$ are both a difference image that is the difference between images originating from different fields. Accordingly, there are cases where the existence of a subject that is motionless (motionless subject) in the frames $F_I$ and $F_{I+1}$ (outlines extending in the horizontal direction in particular) remains to a relatively large extent in addition to a moving subject in the difference images $Q_I$ and $Q_{I+1}$. And the existence of such a motionless subject becomes noise when detecting a moving subject in the difference images $Q_I$ and $Q_{I+1}$. Accordingly, in order to precisely detect a moving subject in the difference images $Q_I$ and $Q_{I+1}$, it is preferable that the existence of motionless subjects in the difference images $Q_I$ and $Q_{I+1}$ is eliminated to the greatest extent possible before performing detection.

Figure 14A:
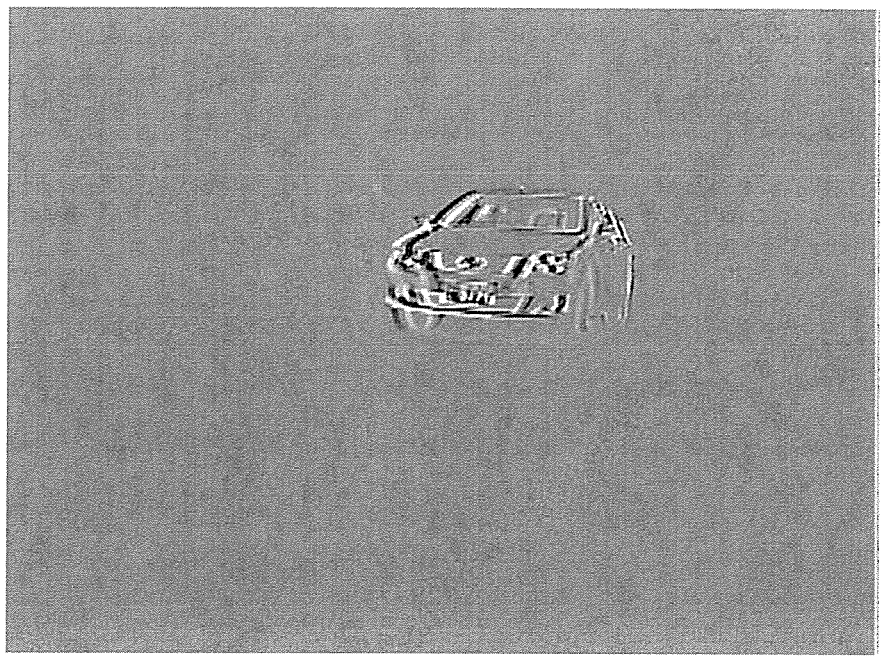
FIG. 14A is a diagram showing an example of another frame that is generated in interlacing detection processing performed on an interlaced image.
Figure 14B:
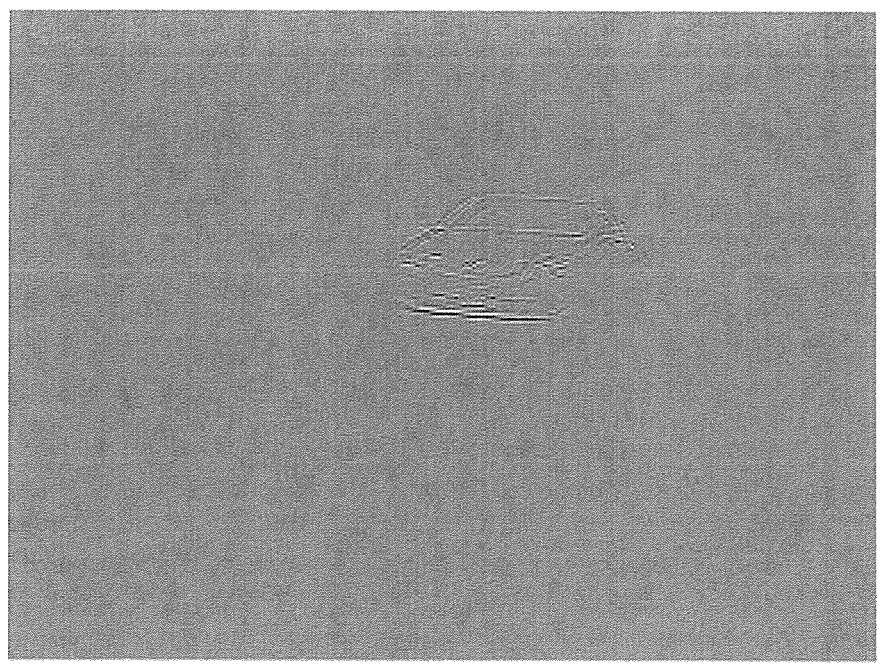
FIG. 14B is a similar diagram in the case of a progressive image.

In view of this, in the subsequent step S24, the interlacing determination unit 43 generates a difference image $R_I$ (see a3 in FIG. 10) by further obtaining the difference between the difference image $Q_I$ and the difference image $Q_{I+1}$. This is because whereas a moving subject exists at different positions in the frames $F_I$ and $F_{I+1}$ on the timeline, motionless subjects exist at the same position, and therefore a further reduction in the influence of the motionless subject can be expected in the difference image $R_I$ that is the difference between the difference images $Q_I$ and $Q_{I+1}$ respectively originating from the frames $F_I$ and $F_{I+1}$. Accordingly, the existence of a moving subject can be relatively emphasized in step S24. Note that FIG. 14A shows an example of the difference image $R_I$ in the case where the frame $F_I$ is an interlaced image, and FIG. 14B shows an example of the difference image $R_I$ in the case where the frame $F_I$ is a progressive image.

Figure 8:
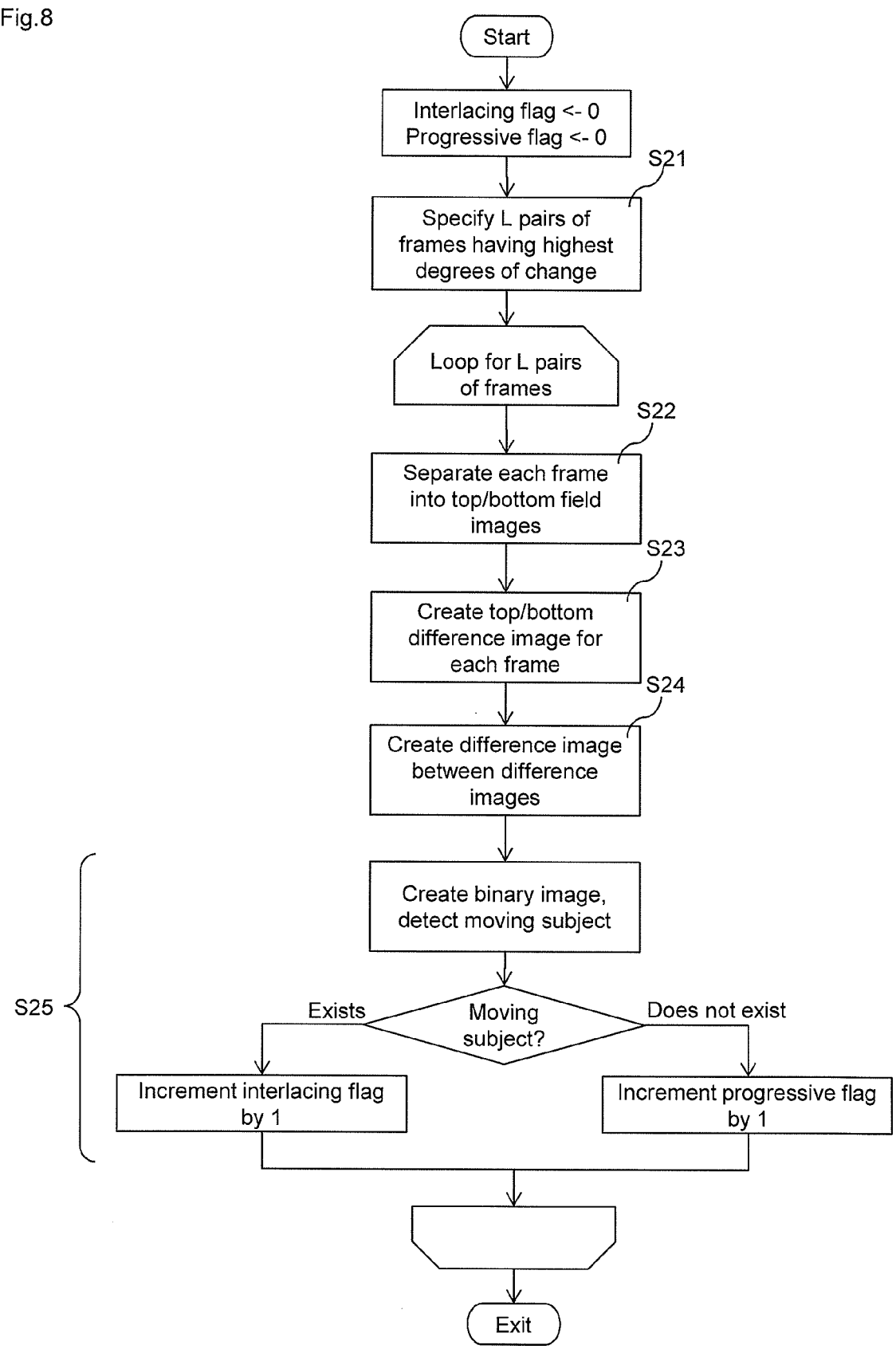
FIG. 8 is a flowchart showing interlacing detection processing.

In the subsequent step S25, the interlacing determination unit 43 converts the difference image $R_I$ into a binary image and determines whether or not a continuous area whose size is greater than a predetermined threshold value exists in the binary image (labeling processing). If such a continuous area exists, it can be determined that a moving subject exists in the difference images $Q_I$ and $Q_{I+1}$, and therefore it is determined that the frames $F_I$ and $F_{I+1}$ are an interlaced image, and an interlaced flag is incremented by one. On the other hand, if such a continuous area does not exist, it can be determined that a moving subject does not exist in the difference images $Q_I$ and $Q_{I+1}$, and therefore it is determined that the frames $F_I$ and $F_{I+1}$ are a progressive image, and a progressive flag is incremented by one. Note that as shown in FIG. 8, it is assumed that the interlaced flag and the progressive flag are set to 0 before step S21.

Accordingly, when the loop of steps S22 to S25 performed on the L pairs of frames is exited, the interlaced flag and the progressive flag indicate the result of making the determination regarding whether or not the frames in the group of target frames $F_1, \ldots, F_K$ are interlaced images L times. As a result, after the end of step S25, the interlacing detection processing shown in FIG. 8 is exited, and then upon returning to step S4 in FIG. 6, it is possible to determine whether or not the group of target frames $F_1, \ldots, F_K$ is an interlaced image group by referencing these flags. In the present embodiment, if the value of the interlaced flag is greater than the value of the progressive flag by a predetermined value (an integer greater than or equal to 0), it is determined that the group of target frames $F_1, \ldots, F_K$ is an interlaced image group.

2-4-4. Field Order Detection Processing

Figure 9:
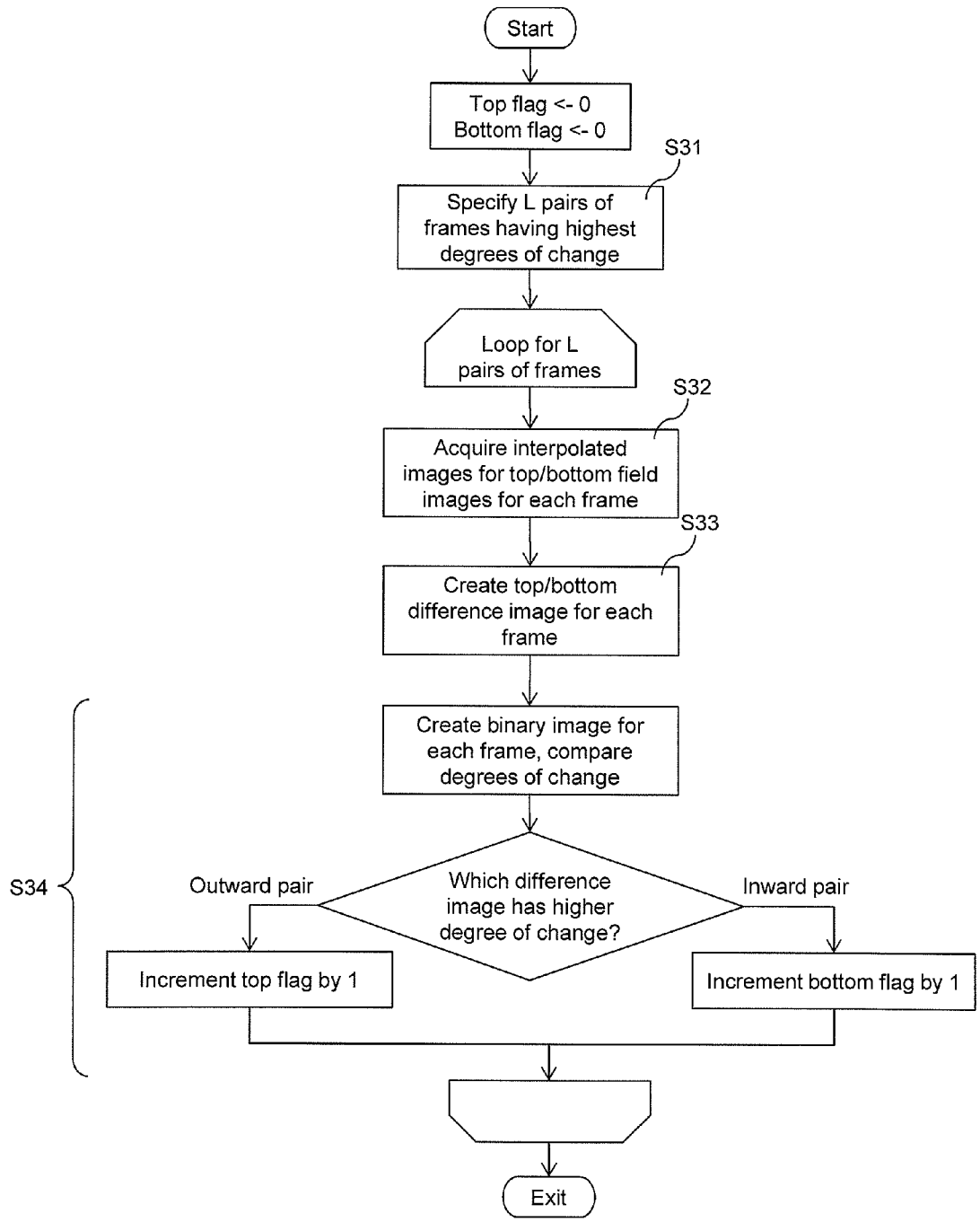
FIG. 9 is a flowchart showing field order detection processing.

Next, processing for determining the field order of the group of target frames $F_1, \ldots, F_K$ (referred to hereinafter as "field order detection processing"), which is included in the above-described step S5, will be described with reference to FIG. 9.

First, in step S31, the field order determination unit 44 specifies L pairs of frames having the highest degrees of change from among pairs of adjacent frames on the timeline in the group of target frames $F_1, \ldots, F_K$. Note that the result of step S21 is used here.

Next, the field order determination unit 44 repeatedly performs steps S32 to S34 on each frame pair included in the L pairs of frames that were specified in step S31. The following describes how steps S32 to S34 are executed on one pair of frames $F_I$ and $F_{I+1}$ with reference to FIG. 15.

Figure 15:
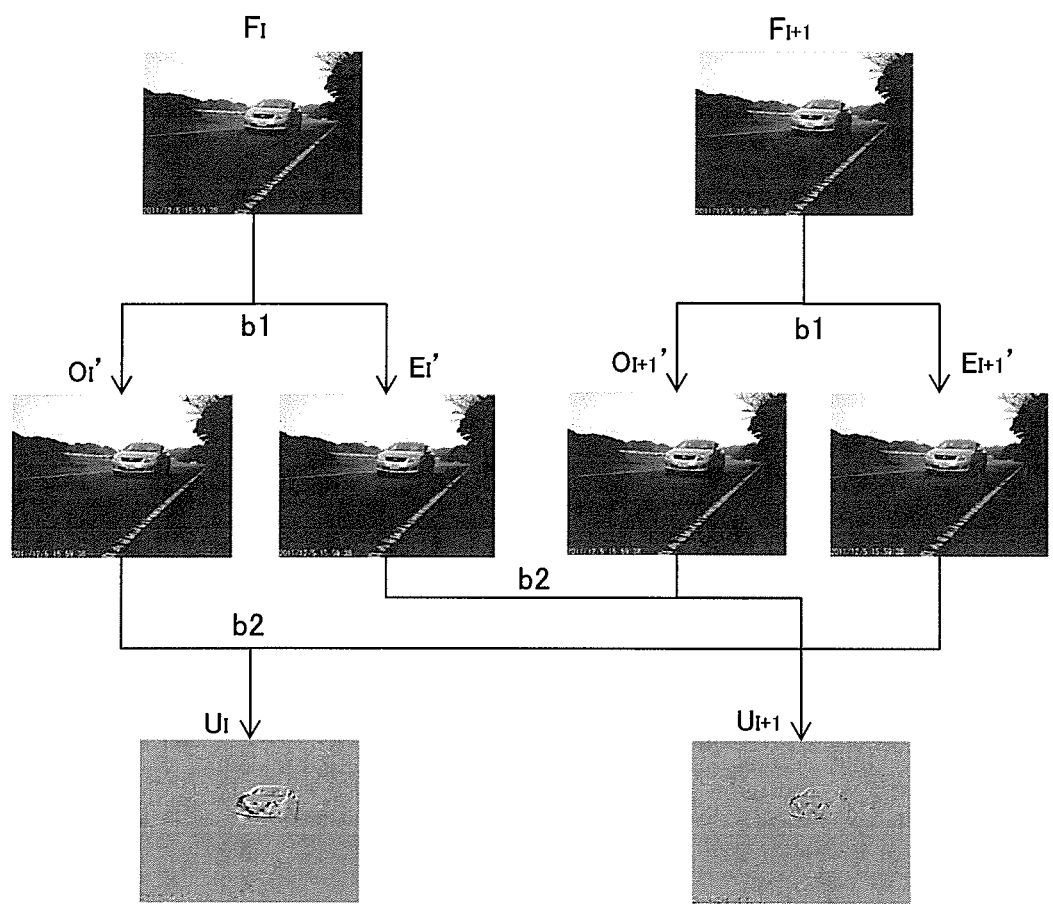
FIG. 15 is a conceptual diagram showing an algorithm for field order detection processing.

First, in step S32, the field order determination unit 44 acquires frames $O_I'$, $E_I'$, $O_{I+1}'$, and $E_{I+1}'$ using the results of step S22 (see b1 in FIG. 15).

Figure 16A:
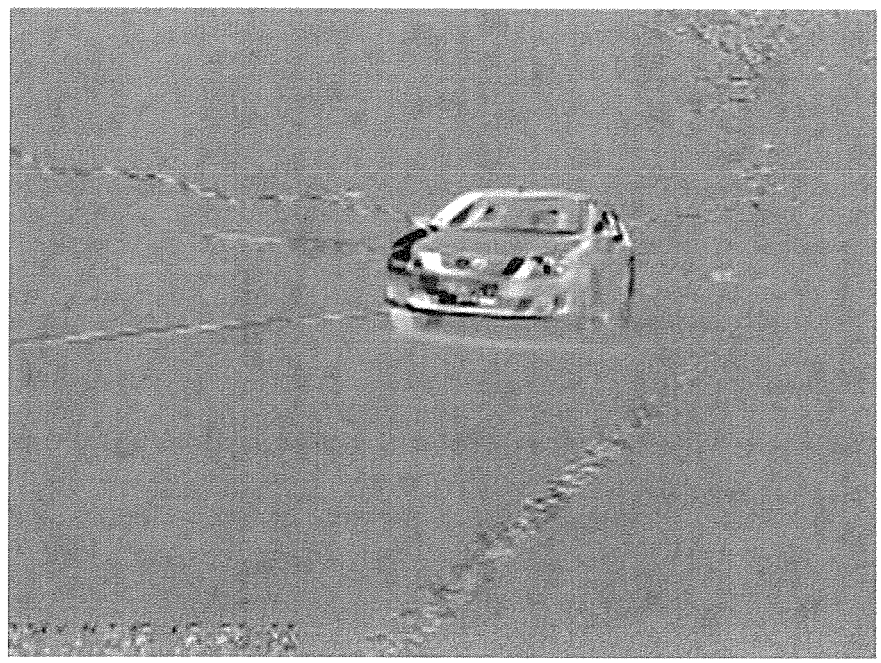
FIG. 16A is a diagram showing an example of a difference image that corresponds to an outward pair when the top field is aligned first.
Figure 16B:
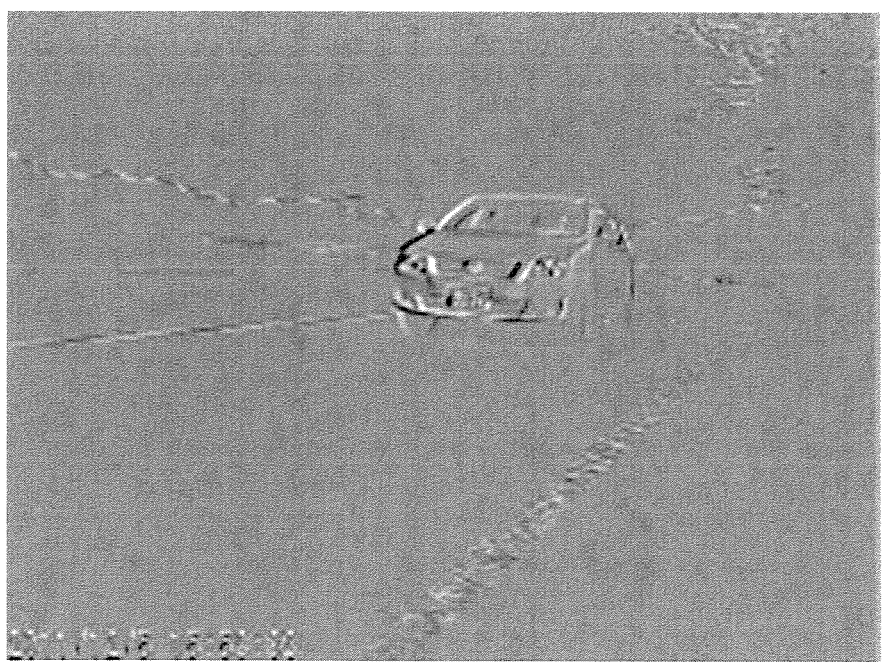
FIG. 16B is a diagram showing an example of a difference image that corresponds to an inward pair when the top field is aligned first.

In the subsequent step S33, the field order determination unit 44 generates a difference image $U_I$ that is the difference between the frame $O_I'$ and the frame $E_{I+1}'$, and a difference image $O_{I+1}$ that is the difference between the frame $E_I'$ and the frame $O_{I+1}'$ (see b2 in FIG. 15). Note that FIG. 16A shows an example of the difference image $U_I$, and FIG. 16B shows an example of the difference image $U_{I+1}$.

Specifically, in step S33, when specifying two pairs of frames for generating the two difference images $U_I$ and $U_{I+1}$ (i.e., the pair of frames $O_I'$ and $E_{I+1}'$ and the pair of frames $E_I'$ and $O_{I+1}'$), each pair is made up of frames that originate from different fields in different frames out of the frames $F_I$ and $F_{I+1}$. Accordingly, either the time difference between the two frames $O_I'$ and $E_{I+1}'$ that correspond to the difference image $U_I$ or the time difference between the two frames $E_I'$ and $O_{I+1}'$ that correspond to the difference image $U_{I+1}$ will without fail be higher than the other. As a result, the degree of change appearing in the difference image that is the difference between the two frames belonging to the pair with the higher time difference will normally be greater than the degree of change appearing in the difference image that is the difference between the two frames belonging to the pair with the lower time difference. For this reason, if the field order is such that the top field comes first, the degree of change appearing in the difference image $U_I$ will normally be higher than the degree of change appearing in the difference image $U_{I+1}$, and if the field order is such that the top field comes last, the degree of change appearing in the difference image $U_I$ will normally be lower than the degree of change appearing in the difference image $U_{I+1}$.

In view of this, in the subsequent step S34, the field order determination unit 44 compares the magnitudes of the degree of change appearing in the difference image $U_I$ and the degree of change appearing in the difference image $U_{I+1}$ in order to determine the field order. Specifically, the field order determination unit 44 binarizes both the difference images $U_I$ and $U_{I+1}$ and compares the sizes of areas appearing in the two binary images. If the area in the difference image $U_I$ is larger, it is determined that the field order is "top field first", and a top flag is incremented by one. This is because in this case, the degree of change appearing in the difference image $U_I$ is higher than the degree of change appearing in the difference image $U_{I+1}$, and it is possible to determine that the time difference between the frames $O_I{'}$ and $E_{I+1}{'}$ that correspond to the difference image $U_I$ is higher than the time difference between the frames $E_I{'}$ and $O_{I+1}{'}$ that correspond to the difference image $U_{I-1}$. On the other hand, if the area in the difference image $U_{I+1}$ is larger, it is determined that the field order is "bottom field first", and a bottom flag is incremented by one. This is because in this case, the degree of change appearing in the difference image $U_{I-1}$ is higher than the degree of change appearing in the difference image $U_I$, and it is possible to determine that the time difference between the frames $E_I{'}$ and $O_{I+1}{'}$ that correspond to the difference image $U_{I+1}$ is higher than the time difference between the frames $O_I{'}$ and $E_{I+1}{'}$ that correspond to the difference image $U_I$. Note that as shown in FIG. 9, it is assumed that the top flag and the bottom flag are set to 0 before step S31.

Accordingly, when the loop of steps S32 to S34 performed on the L pairs of frames is exited, the top flag and the bottom flag indicate the result of making the determination regarding the field order L times. As a result, after the end of step S34, the field order detection processing shown in FIG. 9 is exited, and then upon returning to step S5 in FIG. 6, it is possible to determine the field order of the group of target frames $F_1, \ldots, F_K$ by referencing these flags. In the present embodiment, it is determined that the field order is "top field first" if the value of the top flag is higher, and it is determined that the field order is "bottom field first" if the value of the bottom flag is higher.

3. Application

The image processing program 2 can handle image processing performed on a wide variety of still images and moving images. Therefore, it is also applicable to, for example, the analysis of surveillance video from a security camera by an organization such as the police in order to investigate an incident. In the analysis of surveillance video from a security camera, it is possible for it to be important to subject the surveillance video to image processing in units of still images, and jaggedness and flickering that appears in interlaced images is likely to be a problem in the still images. Accordingly, the above-described function of the image processing program 2 for automatically executing deinterlacing processing when importing image data is particularly useful in performing image processing on surveillance video from a security camera.

4. Features 4-1

In the above embodiment, it is automatically determined whether or not a group of target frames is an interlaced image group by performing image processing on the body data of the group of target frames. The group of target frames is then automatically deinterlaced in the case of determining that it is an interlaced image group. Accordingly, rather than being limited to frames in a data format according to which a flag indicating the fact of being interlaced images is recorded as metadata, it is possible to correctly determine whether or not frames in a wide variety of data formats are interlaced images.

4-2

In the above embodiment, the top field image and the bottom field image from the same target frame are compared (step S23), the influence of a motionless subject is reduced using plural target frames that are different from each other (step S24), and then it is determined whether or not a moving subject exists (step S25). In other words, it is determined whether or not a moving subject exists after emphasizing any moving subjects and reducing noise corresponding to any motionless subjects. This enables precisely determining whether or not the frames in a group of target frames are interlaced images.

4-3

In the above embodiment, the field order is automatically determined for a group of target frames that was determined to be an interlaced image group (step S5). Also, the progressive frames that are to be generated in step S10 or S11 are correctly ordered in step S6 or S7 in accordance with the field order that was determined in step S5. Accordingly, the arrangement of progressive frames is consistent with the flow of time, and a moving subject moving straight forward is recorded such that it moves straight forward rather than being recorded such that it moves back and forth as it moves forward.

4-4

In the above embodiment, the result of deinterlacing is that two frames respectively corresponding to a top field image and a bottom field image are generated for each frame included in a group of target frames. This prevents information that the original group of target frames had from being missing in the new group of progressive frames.

4-5

In the above embodiment, steps S22 to S25 are executed on only some of the frames (L pairs of frames) included in a group of target frames in order to determine whether or not the group of target frames is interlaced as a whole. This enables reducing the computational load. Also, if it is determined that a group of target frames is interlaced as a whole, the entirety of that group of target frames is deinterlaced (step S10 or S11). This prevents a situation in which only some of the target frames are deinterlaced, and the frame rate becomes distorted.

5. Variations

Although an embodiment of the present invention has been described above, the present invention is not limited to the above embodiment, and various modifications are possible within a scope that does not deviate from the gist of the invention. For example, the following modifications are possible.

5-1

The timing of the execution of the above-described deinterlacing processing is not limited to being when data import processing is executed. For example, a configuration is possible in which deinterlacing processing is implemented as one of the image processing modules that can be executed on the selected frame group, and is executed upon receiving a user instruction after image data has been imported. Also, it may be executed when playback processing is executed.

5-2

In the above embodiment, steps S22 to S25 are executed on only some of the frames included in a group of target frames in order to determine whether or not the group of target frames is an interlaced image group, but these steps may be executed on all of the frames. Also, although deinterlacing can only be performed on the entirety of a group of target frames in the case of performing deinterlacing in the above embodiment, a configuration is possible in which deinterlacing can be performed on only some target frames.

5-3

The condition for performing de-squeezing in the determination of step S9 is not limited to the condition described above. Any image size can be employed as long as it is an image size of image data that is thought to have been recorded with one aspect ratio based on the assumption of being played back with a different aspect ratio.

5-4

In the above embodiment, a step (step S23) for comparing two field images belonging to the same target frame (more accurately, two frames respectively originating from the two field images) is executed, and then a step S24 for comparing multiple target frames is executed thereafter. However, a configuration is possible in which the step for comparing multiple target frames is executed, and then the step for comparing two field images belonging to the same target frame is executed thereafter. For example, a configuration is possible in which a difference image that is the difference between two target frames is generated, two field images are generated by deinterlacing that difference image, another difference image is generated from the two field images, and then the binarizing processing of step S25 is performed.

5-5

Rather than being limited to the method of step S24, various known techniques can be employed as the method of reducing noise in a difference image. For example, dilation/erosion processing may be executed instead of or in addition to the above-described method. According to this configuration, relatively small areas corresponding to motionless subjects disappear, but it is possible to allow a relatively large area corresponding to a moving subject to remain.

5-6

Although two progressive frames are generated from one target frame in deinterlacing processing in the above embodiment, the number of progressive frames generated from one target frame may be one, or may be three or more.

5-7

The mode of generating progressive frames in steps S10 and S11 is not limited to the mode described above, and any mode can be employed as long as a frame that corresponds to at least either the top field image or the bottom field image of a target frame is generated. For example, the top field image and the bottom field image may be directly used as deinterlaced frames, without being subjected to interpolation.

5-8

Figure 17:
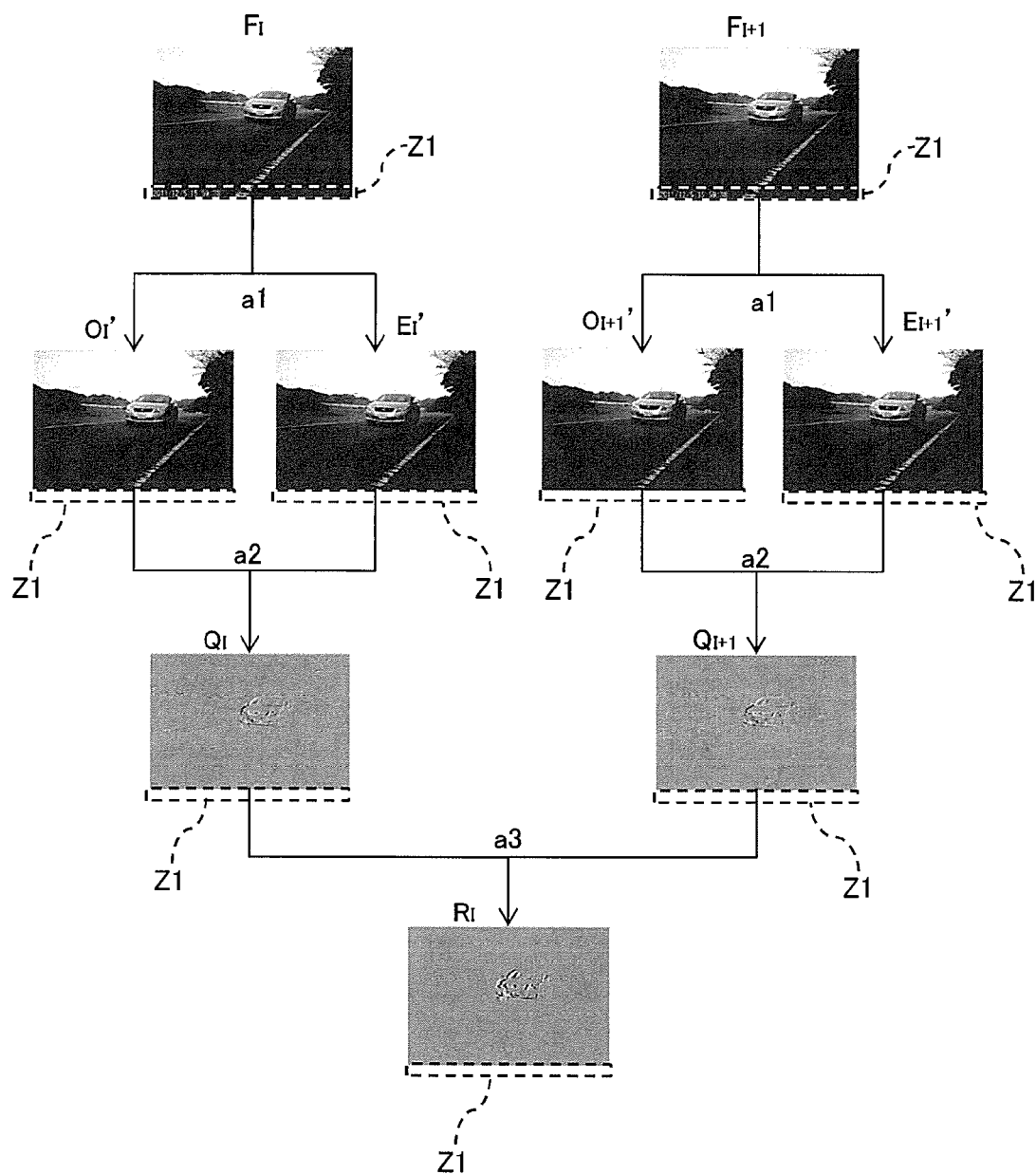
FIG. 17 is a conceptual diagram showing an algorithm for interlacing detection processing according to a variation.

A configuration is possible in which in step S22, first, the interlacing determination unit 43 excludes a specific area Z1 from the frames $F_I$ and $F_{I+1}$ in accordance with a predetermined rule, and then separates the frames $F_I$, $F_{I-1}$ resulting from the exclusion of the specific area Z1 into the top field images $O_I$ and $O_{I+1}$ and the bottom field images $E_I$ and $E_{I+1}$ (see FIG. 17). Here, the specific area Z1 to be excluded is a horizontally long and narrow area at the bottom of the frame, for example. In this case, the predetermined rule for specifying the position of the specific area Z1 can be a rule having information indicating that, for example, X % at the bottom of the frame is to be excluded (or X % at the top of the frame is to be left in the frame). Note that the reason for excluding the specific area Z1 is that caption information such as the time is often displayed in this area Z1. In other words, the specific area Z1 is excluded because if it is left in the frame, it is possible that in the subsequent steps S23 to S25, changes in the caption will be reflected in the difference images $Q_I$, $Q_{I+1}$, and $R_I$, and it will become impossible to correctly determine whether a moving subject exists.

Accordingly, in view of this, instead of or in addition to an area at the bottom of the frame, it is possible to exclude X % at the top of the frame, for example, as the specific area Z1. Alternatively, the specific area Z1 to be excluded is not limited to being an area whose position is determined in advance, and a configuration is possible in which, by performing image processing on the frames $F_I$ and $F_{I+1}$, it is automatically determined whether or not an area for displaying information that is to be excluded (e.g., captions) exists, and an area is excluded as the specific area Z1 only if such an area exists. As another alternative, the user may be allowed to manually select the specific area Z1 (or the area to be left in the frame other than the specific area Z1) before data import processing is started.

Furthermore, from a similar viewpoint, the specific area Z1 may be excluded also in the case where the interlacing determination unit 43 specifies L pairs of frames having the highest degrees of change from among the group of target frames $F_1, \ldots, F_K$ in step S21. In other words, the interlacing determination unit 43 may generate (K−1) difference images $P_1, \ldots, P_K$ from which the specific area Z1 has been excluded. In this case, it is possible to avoid the situation in which changes in the caption are reflected in the difference images $P_1, \ldots, P_{K-1}$, and it becomes impossible to correctly determine pairs of frames that have a high degree of change due to a moving subject.

Figure 18:
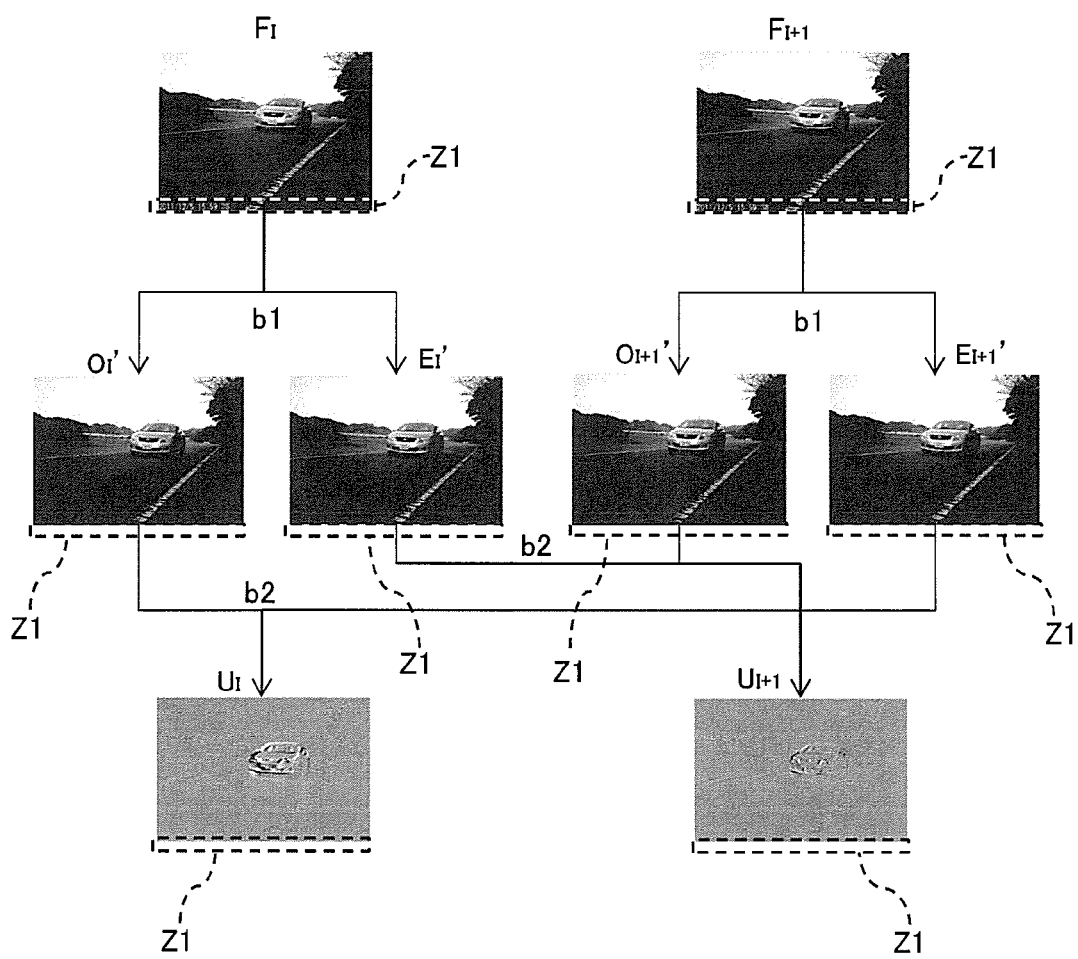
FIG. 18 is a conceptual diagram showing an algorithm for field order detection processing according to a variation.

Furthermore, from a similar viewpoint, a configuration is possible in which in step S31 and/or steps S32 to S34 as well, the field order determination unit 44 executes the above-described processing after excluding the specific area Z1 from the frames targeted for processing (see FIG. 18). In this case as well, it is possible to avoid the situation in which in step S31 and/or steps S32 to S34, changes in the caption are reflected in the frames targeted for processing, and it becomes impossible to correctly determine the field order.

5-9

In the above embodiment, the entirety of the image data imported to the original image area 51 is saved as still image files. However, the image data imported to the original image area 51 may be saved as a moving image file.

The invention claimed is:

1. An image processing apparatus comprising:
an interlacing determination unit configured to, by performing image processing on body data of a frame, determine whether or not the frame is an interlaced image that includes a top field image and a bottom field image at different times on a timeline; and
a deinterlacing unit configured to, in a case of a determination that the frame is an interlaced image, deinterlace the frame and generate a new frame.

2. The image processing apparatus according to claim 1, wherein the interlacing determination unit is configured to determine whether or not the frame is the interlaced image by comparing the top field image and the bottom field image and determining whether or not a moving subject exists in the frame.

3. The image processing apparatus according to claim 2, wherein the interlacing determination unit is configured to determine whether or not the frame is the interlaced image by determining whether or not a moving subject exists in the frame after reducing influence of a motionless subject in the frame using the body data of a plurality of frames on the timeline.

4. The image processing apparatus according to claim 2, wherein the interlacing determination unit is configured to determine whether or not a group of frames on the timeline is a group of interlaced images by performing image processing on the body data of at least a portion of the frames included in the group of frames, and in a case of a determination that the group of frames is a group of interlaced images, the deinterlacing unit is configured to deinterlace the group of frames and generate a group of new frames.

5. The image processing apparatus according to claim 2, further comprising:

an order determination unit configured to, in a case of a determination that the frame is an interlaced image, determine a field order of the top field image and the bottom field image by performing image processing on the body data of the frame.

6. The image processing apparatus according to claim 2, wherein the deinterlacing unit is configured to generate, as the new frame, a frame that corresponds to at least one of the top field image and the bottom field image.

7. The image processing apparatus according to claim 2, wherein the deinterlacing unit is configured to generate, as the new frames, two frames that respectively correspond to the top field image and the bottom field image.

8. The image processing apparatus according to claim 1, wherein the interlacing determination unit is configured to determine whether or not the frame is the interlaced image by determining whether or not a moving subject exists in the frame after reducing influence of a motionless subject in the frame using the body data of a plurality of frames on the timeline.

9. The image processing apparatus according to claim 8, wherein the interlacing determination unit is configured to determine whether or not a group of frames on the timeline is a group of interlaced images by performing image processing on the body data of at least a portion of the frames included in the group of frames, and in a case of a determination that the group of frames is a group of interlaced images, the deinterlacing unit is configured to deinterlace the group of frames and generate a group of new frames.

10. The image processing apparatus according to claim 8, further comprising:

an order determination unit configured to, in a case of a determination that the frame is an interlaced image, determine a field order of the top field image and the bottom field image by performing image processing on the body data of the frame.

11. The image processing apparatus according to claim 8, wherein the deinterlacing unit is configured to generate, as the new frame, a frame that corresponds to at least one of the top field image and the bottom field image.

12. The image processing apparatus according to claim 8, wherein the deinterlacing unit is configured to generate, as the new frames, two frames that respectively correspond to the top field image and the bottom field image.

13. The image processing apparatus according to claim 1, wherein the interlacing determination unit is configured to determine whether or not a group of frames on the timeline is a group of interlaced images by performing image processing on the body data of at least a portion of the frames included in the group of frames, and in a case of a determination that the group of frames is a group of interlaced images, the deinterlacing unit is configured to deinterlace the group of frames and generate a group of new frames.

14. The image processing apparatus according to claim 13, further comprising:

an order determination unit configured to, in a case of a determination that the frame is an interlaced image, determine a field order of the top field image and the bottom field image by performing image processing on the body data of the frame.

15. The image processing apparatus according to claim 1, further comprising:

an order determination unit configured to, in a case of a determination that the frame is an interlaced image, determine a field order of the top field image and the bottom field image by performing image processing on the body data of the frame.

16. The image processing apparatus according to claim 15, wherein the order determination unit is configured to compare a first difference between the top field image of a first frame on the timeline and the bottom field image of a second frame on the timeline, with a second difference between the bottom field image of the first frame and the top field image of the second frame, and determine the field order according to magnitudes of the first difference and the second difference.

17. The image processing apparatus according to claim 15, wherein the deinterlacing unit is configured to generate, as the new frames, two frames that respectively correspond to the top field image and the bottom field image, and orders the two frames in accordance with the determined field order.

18. The image processing apparatus according to claim 1, wherein the deinterlacing unit is configured to generate, as the new frame, a frame that corresponds to at least one of the top field image and the bottom field image.

19. The image processing apparatus according to claim 1, wherein the deinterlacing unit is configured to generate, as the new frames, two frames that respectively correspond to the top field image and the bottom field image.

20. A non-transitory computer-readable recording medium storing an image processing program, the program causing a computer to execute steps of:

performing image processing on body data of a frame to determine whether or not the frame is an interlaced image that includes a top field image and a bottom field image at different times on a timeline; and in a case of a determination that the frame is an interlaced image, deinterlacing the frame and generating a new frame.

* * * * *